US008319980B2

(12) United States Patent
Hatakeyama

(10) Patent No.: US 8,319,980 B2
(45) Date of Patent: Nov. 27, 2012

(54) INFORMATION PROCESSING APPARATUS AND INFORMATION PROCESSING METHOD THAT ALLOWS PRINTING USING A HOT FOLDER

(75) Inventor: Yuki Hatakeyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 1132 days.

(21) Appl. No.: 12/046,646

(22) Filed: Mar. 12, 2008

(65) Prior Publication Data

US 2008/0297833 A1      Dec. 4, 2008

(30) Foreign Application Priority Data

May 30, 2007    (JP) ................................. 2007-143790

(51) Int. Cl.
  *G06F 3/12*      (2006.01)
  *G06F 3/048*     (2006.01)
  *G06K 15/00*     (2006.01)
  *H04N 1/00*      (2006.01)
  *H04N 1/60*      (2006.01)

(52) U.S. Cl. ........ 358/1.1; 358/1.14; 358/1.16; 358/1.9; 715/764

(58) Field of Classification Search ................... 358/1.1, 358/1.14, 1.13, 1.9, 1.18, 1.2, 1.12, 302, 358/501, 1.6; 715/764, 276
See application file for complete search history.

(56) References Cited

U.S. PATENT DOCUMENTS

| | | | |
|---|---|---|---|
| 5,493,408 A | 2/1996 | Kurogane et al. | |
| 6,094,548 A | 7/2000 | Gunning et al. | |
| 6,330,068 B1 | 12/2001 | Matsuyama | |
| 7,580,139 B2 * | 8/2009 | Oba | 358/1.1 |
| 2005/0005047 A1 | 1/2005 | Keeney et al. | |
| 2005/0052660 A1 | 3/2005 | Sabbagh et al. | |
| 2005/0073717 A1 * | 4/2005 | Arakawa | 358/1.15 |
| 2005/0105135 A1 * | 5/2005 | Takahashi | 358/1.18 |
| 2006/0221360 A1 * | 10/2006 | Yoshida | 358/1.1 |
| 2006/0279780 A1 * | 12/2006 | Anno et al. | 358/1.15 |

(Continued)

FOREIGN PATENT DOCUMENTS

EP        1178393 A2       2/2002

(Continued)

OTHER PUBLICATIONS

Extended European Search Report dated May 28, 2008 issued in corresponding European Patent Application No. 08152676.6-1522.

(Continued)

*Primary Examiner* — Benny Q Tieu
*Assistant Examiner* — Ngon Nguyen
(74) *Attorney, Agent, or Firm* — Rossi, Kimms & McDowell LLP

(57) ABSTRACT

This invention enables to change the settings of each hot folder when the configuration of a printer has changed. In order to achieve the object, this invention provides a client for transmitting electronic data to a printer via a hot folder which sets attribute information. The client includes an unit which detects a change in processing contents executable by the printer, an unit which holds information about an operation of the client upon detection in association with the hot folder, an unit which determines whether the printer can execute output processing complying with the attribute information by comparing the changed processing contents with the attribute information set in the hot folder, and an unit which controls the operation of the client based on the information about the operation held in association with the hot folder which sets the attribute information determined not to allow the execution.

10 Claims, 31 Drawing Sheets

U.S. PATENT DOCUMENTS

2007/0005561 A1* 1/2007 Sakura et al. .................. 707/1
2007/0086038 A1   4/2007 Matsuzaki

FOREIGN PATENT DOCUMENTS

| JP | 2000-118095 A | 4/2000 |
| JP | 2001290626 A | 10/2001 |
| JP | 2003250017 A | 9/2003 |
| JP | 2004090423 A | 3/2004 |
| JP | 2007109021 A | 4/2007 |
| KR | 10-2007-0047079 A | 5/2007 |

OTHER PUBLICATIONS

Notification of First Office Action issued in corresponding Chinese Patent Application No. 2008100906044 dated Jan. 22, 2010.

* cited by examiner

F I G. 2
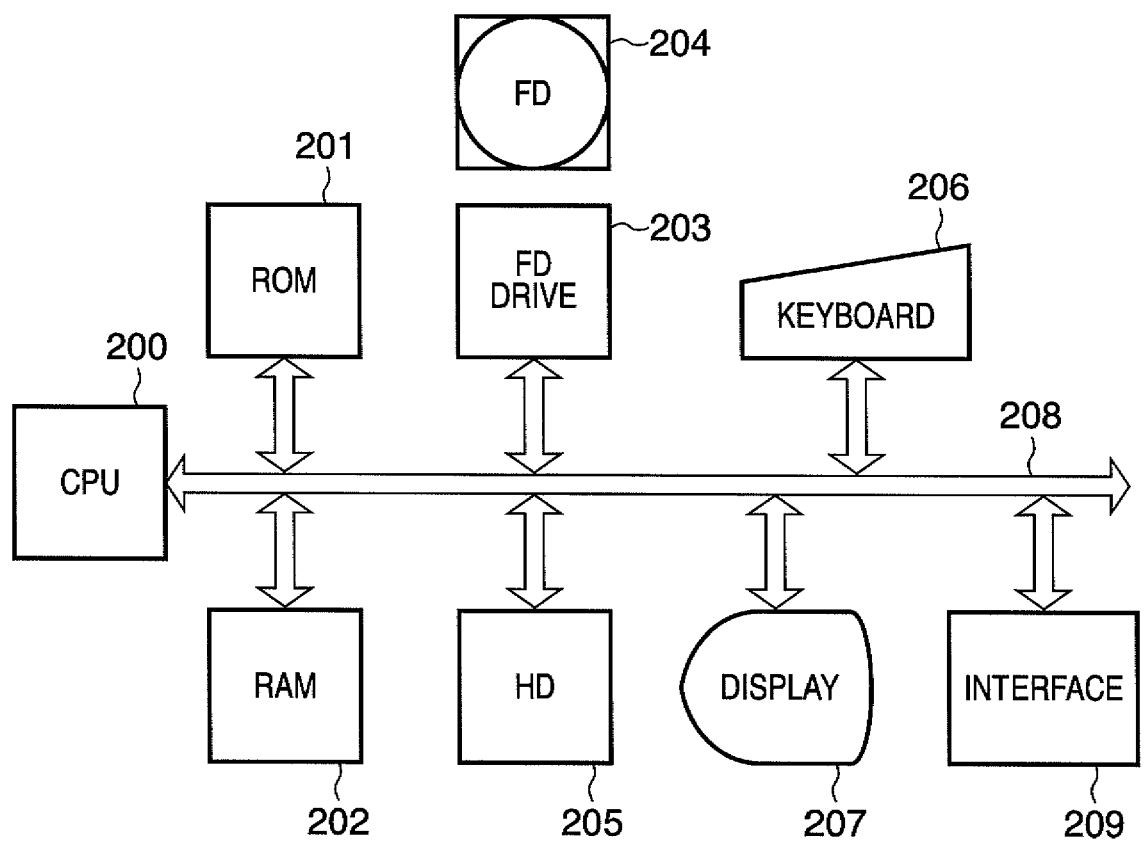

FIG. 12

HOT FOLDER MANAGEMENT TABLE

| HOT FOLDER NAME | PRINTER NAME | STATUS | FOLDER PATH | JOB TICKET | IF PRINTER CANNOT PROCESS |
|---|---|---|---|---|---|
| Hot001 | PRINTER A | NORMAL | C:¥Hot001 | JOB TICKET 1 | NO CHANGE |
| Hot002 | PRINTER A | PRINT DISABLE | C:¥Hot002 | JOB TICKET 2 | STOP HOT FOLDER |
| Hot003 | PRINTER A | ACCESS REJECTED | C:¥Hot003 | JOB TICKET 3 | DISPLAY PRINTING ATTRIBUTE LIST |
| Hot004 | PRINTER X | PRINTER UNKNOWN | C:¥Hot004 | JOB TICKET 4 | AUTOMATICALLY CHANGE PRINTING ATTRIBUTE |
| Hot005 | PRINTER X | JOB TICKET UNKNOWN | C:¥Hot005 | JOB TICKET 5 | DISPLAY PRINTER LIST |
| Hot006 | PRINTER B | IN PRINTING | C:¥Hot006 | JOB TICKET 6 | AUTOMATICALLY CHANGE PRINTER |
| Hot007 | PRINTER A | FOLDER UNKNOWN | C:¥Hot007 | JOB TICKET 7 | NO CHANGE |

FIG. 13

ATTRIBUTE INFORMATION MANAGEMENT TABLE

| | | |
|---|---|---|
| 1301 — NUMBER OF COPIES | 10 | — 1302 |
| 1303 — PAGE RANGE | 1~10 | — 1304 |
| 1305 — PAPER SIZE | A4 | — 1306 |
| 1307 — PRINTING METHOD | DOUBLE-SIDED | — 1308 |
| 1309 — PUNCH | ON | — 1310 |

NETWORK PRINTER CONFIGURATION INFORMATION TABLE

| | | |
|---|---|---|
| 1401 — PAPER SIZE | A3, A4, B4, B5 | —1402 |
| 1403 — PRINTING METHOD | SINGLE-SIDED, DOUBLE-SIDED | —1404 |
| 1405 — PUNCH | × | —1406 |

601

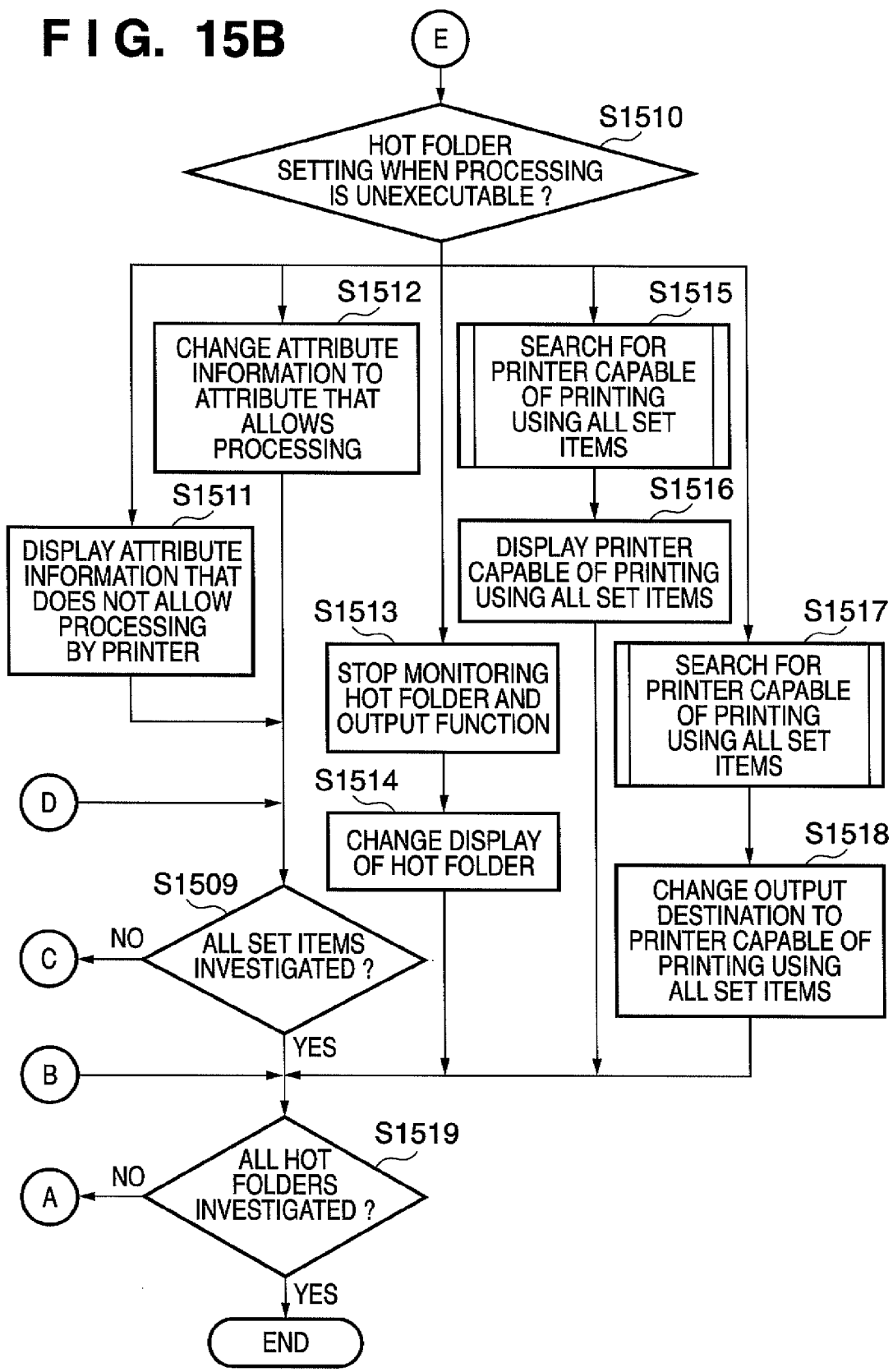

F I G. 18
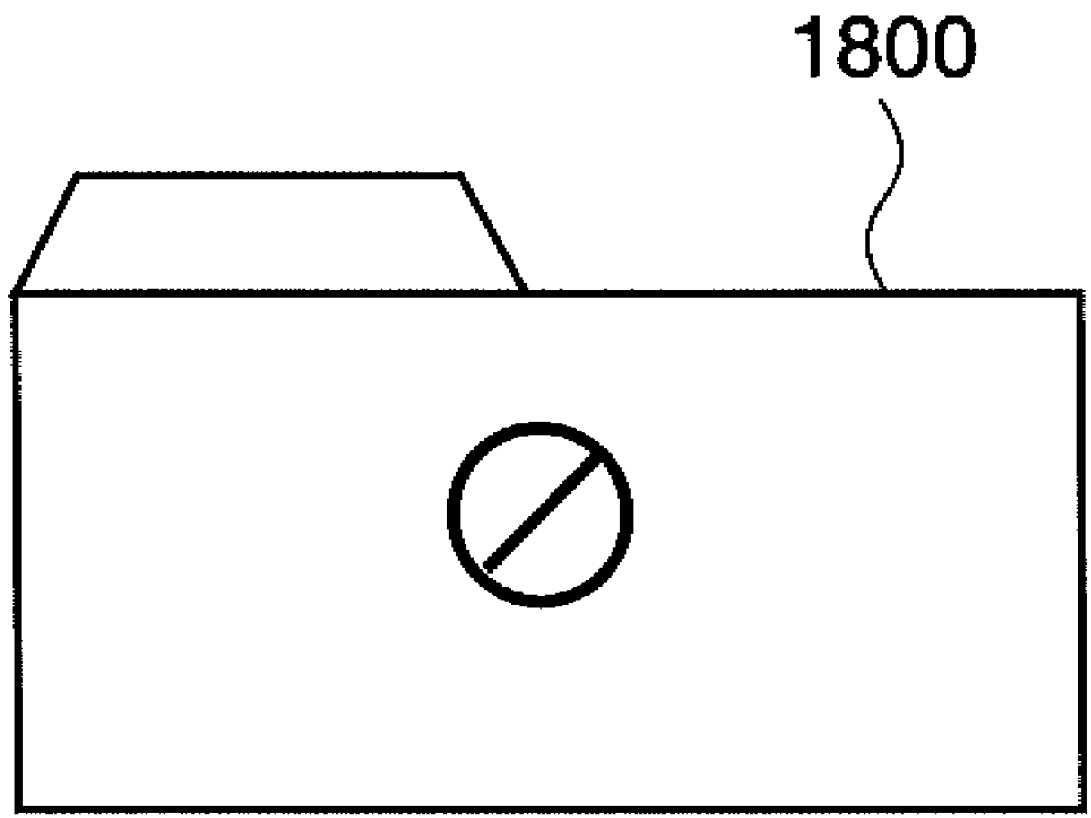

FIG. 26

| HOT FOLDER NAME (2601) | PRINTER NAME (2602) | STATUS (2603) | FOLDER PATH (2604) | JOB TICKET (2605) | IF PRINTER CANNOT PROCESS (2606) |
|---|---|---|---|---|---|
| Hot001 | PRINTER A | NORMAL | C:¥Hot001 | JOB TICKET 1 | DIRECTLY TRANSMIT JOB |
| Hot002 | PRINTER A | PRINT DISABLE | C:¥Hot002 | JOB TICKET 2 | STOP HOT FOLDER |
| Hot003 | PRINTER A | ACCESS REJECTED | C:¥Hot003 | JOB TICKET 3 | DISPLAY PRINTING ATTRIBUTE LIST |
| Hot004 | PRINTER X | PRINTER UNKNOWN | C:¥Hot004 | JOB TICKET 4 | AUTOMATICALLY CHANGE PRINTING ATTRIBUTE |
| Hot005 | PRINTER X | JOB TICKET UNKNOWN | C:¥Hot005 | JOB TICKET 5 | DISPLAY PRINTER LIST |
| Hot006 | PRINTER B | IN PRINTING | C:¥Hot006 | JOB TICKET 6 | AUTOMATICALLY CHANGE PRINTER |
| Hot007 | PRINTER A | FOLDER UNKNOWN | C:¥Hot007 | JOB TICKET 7 | NO CHANGE |

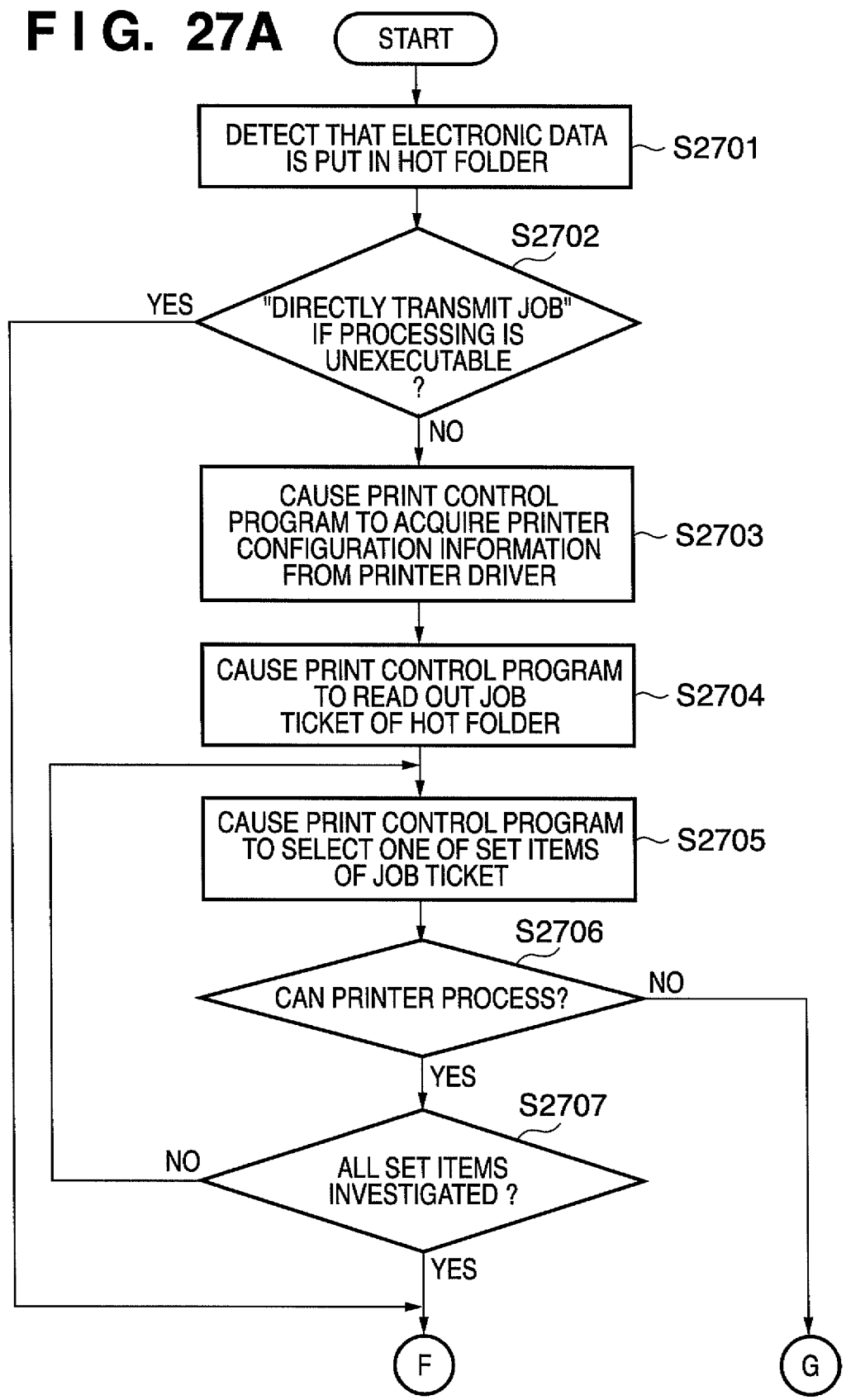

F I G. 28
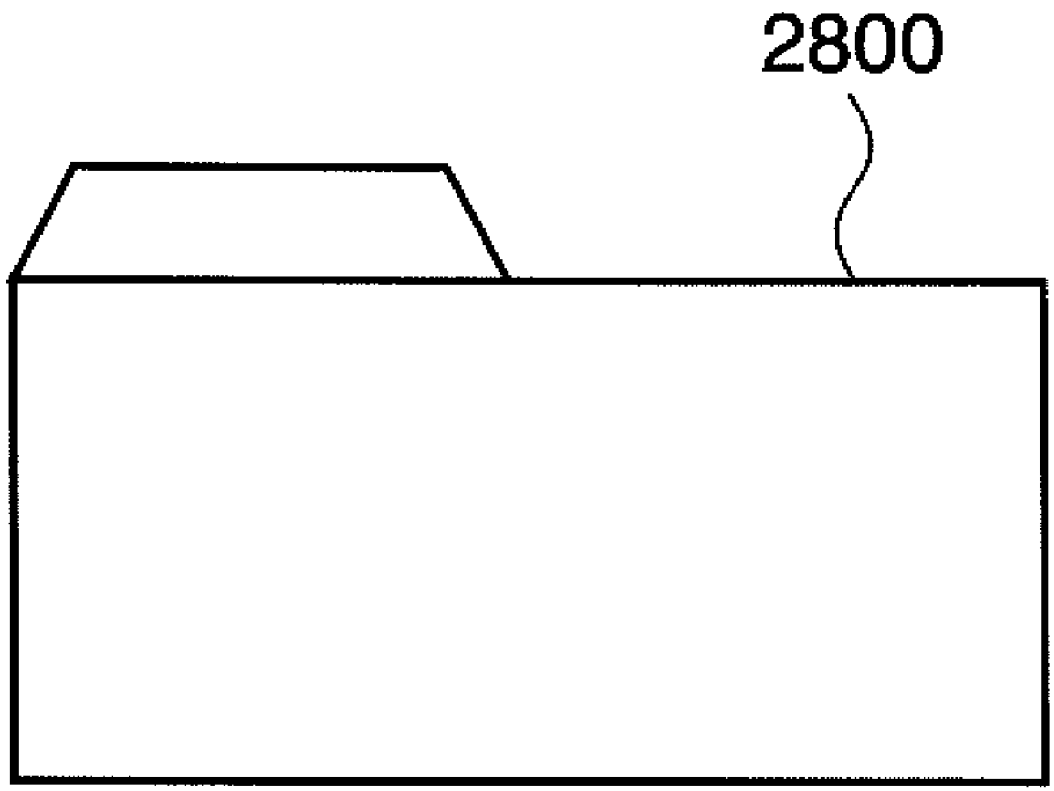

INFORMATION PROCESSING APPARATUS AND INFORMATION PROCESSING METHOD THAT ALLOWS PRINTING USING A HOT FOLDER

BACKGROUND OF THE INVENTION

1. Field of the Invention

The present invention relates to an information processing apparatus and an information processing method and, more particularly, to an information processing technique in an information processing apparatus having a hot folder function.

2. Description of the Related Art

Conventionally, a user who wants to transmit electronic data to an image forming apparatus and print it generally activates a printer driver, sets, on it, various kinds of attribute information for print processing, and then transmits the electronic data to the image forming apparatus.

Recently, however, a "hot folder" is used to improve the operability in print processing. The hot folder causes an image forming apparatus to execute print processing based on preset attribute information (e.g., Japanese Patent Laid-Open No. 2000-118095).

Using the hot folder, a user can make an image forming apparatus execute desired print processing complying with attribute information only by putting (drag & drop) electronic data (without executing various operations in print processing).

However, the user needs to set in advance the attribute information to be set in the hot folder. For example, if the configuration of an image forming apparatus of a transmission destination has changed, the user must change the settings of all associated hot folders every time. Hence, when the image forming apparatus has changed its configuration, the hot folder imposes a heavy operation load on the user.

Additionally, when the user inputs electronic data by drag & drop, the hot folder transmits the electronic data to the image forming apparatus and causes it to execute print processing independently of whether the set attribute information matches the configuration of the image forming apparatus. For this reason, if the user fails to change the settings, the image forming apparatus executes inappropriate print processing.

To prevent this, the system may be designed to confirm at the time of drag & drop of electronic data whether the attribute information set in the hot folder matches the configuration of the image forming apparatus, and if the attribute information and configuration do not match, notify the user of it.

However, if the user must receive the notification in every drag & drop, and investigate and change attribute information that requires change, the operability of the hot folder in print processing becomes poor, resulting in inconvenience for the user.

SUMMARY OF THE INVENTION

The present invention has been made in consideration of the above problems, and has as its object to enable to change the settings of each hot folder without deteriorating the operability for a user who uses a hot folder when the configuration of an image forming apparatus has changed.

In order to achieve the above object, according to the present invention, there is provided an information processing apparatus. That is, an information processing apparatus which is connected to an image forming apparatus and transmits, to the image forming apparatus, electronic data via a hot folder which sets attribute information defining output processing to be executed by the image forming apparatus, comprising:

a detection unit configured to detect a change in processing contents executable by the image forming apparatus;

a holding unit configured to hold, in association with the hot folder, information about an operation of the information processing apparatus upon detecting the change in the processing contents;

a determination unit configured to determine whether the image forming apparatus can execute output processing complying with the attribute information by comparing the changed processing contents with the attribute information set in the hot folder; and a control unit configured to control the operation of the information processing apparatus on the basis of the information about the operation held in association with the hot folder which sets the attribute information determined by the determination unit not to allow the execution.

In order to achieve the above object, according to the present invention, there is also provided an information processing method. That is, an information processing method of an information processing apparatus which is connected to an image forming apparatus and transmits, to the image forming apparatus, electronic data via a hot folder which sets attribute information defining output processing to be executed by the image forming apparatus, comprising the steps of:

detecting a change in processing contents executable by the image forming apparatus;

holding, in association with the hot folder, information about an operation of the information processing apparatus upon detecting the change in the processing contents;

determining whether the image forming apparatus can execute output processing complying with the attribute information by comparing the changed processing contents with the attribute information set in the hot folder; and controlling the operation of the information processing apparatus on the basis of the information about the operation held in association with the hot folder which sets the attribute information determined in the determining step not to allow the execution.

According to the present invention, it is possible to change the settings of each hot folder without deteriorating the operability for a user who uses a hot folder even when the configuration of an image forming apparatus has changed.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram for explaining the hardware configuration of each of clients (computers) 101 to 103;

FIG. 12 is a view showing an example of a hot folder management table;

FIG. 13 is a view showing an example of an attribute information management table;

FIG. 14 is a view showing an example of a network printer configuration information table;

FIG. 15B is a flowchart illustrating the sequence of processing of the print control program 303 in a client;

FIG. 18 is a view showing an example of the icon display of a folder which is displayed by a folder display change unit 707 of the print control program 303 when the status input to a status storage field 1203 is "print disable";

FIG. 26 is a view showing an example of a hot folder management table;

FIG. 27A is a flowchart illustrating the sequence of processing of the print control program 2400 in a client;

FIG. 28 is a view showing an example of a task tray icon; and

DESCRIPTION OF THE EMBODIMENTS

Preferred embodiments of the present invention will now be described in detail in accordance with the accompanying drawings.

First Embodiment

<1. Print System>

Figure 1:
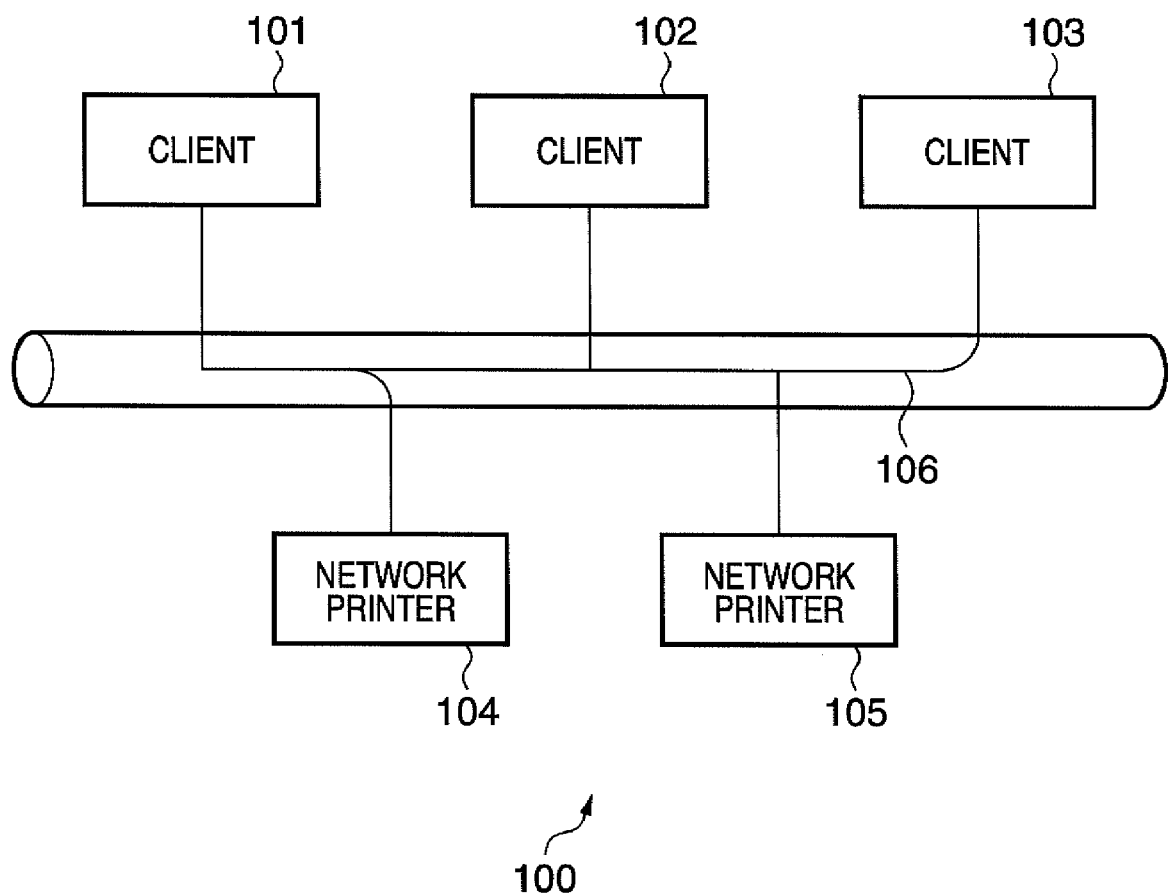
FIG. 1 is a block diagram showing the overall arrangement of a print system 100 according to the first embodiment of the present invention.

FIG. 1 is a block diagram showing the overall arrangement of a print system 100 according to the first embodiment of the present invention. The print system 100 includes clients (computers) 101 to 103 each serving as an information processing apparatus, and network printers 104 and 105 each serving as an image forming apparatus, as shown in FIG. 1. The clients 101 to 103 and network printers 104 and 105 are connected to each other via a network 106.

Each of the clients (computers) 101 to 103 stores a print control program (to be described later) in an executable state. The clients (computers) 101 to 103 have a function of managing the network printers 104 and 105 included in the print system 100. The clients (computers) 101 to 103 also have a function of storing files to be used in the network or monitoring the use state of the network.

More specifically, the clients (computers) 101 to 103 have a function of generating a print job by themselves and issuing a schedule request to the schedulers of the network printers 104 and 105. The clients (computers) 101 to 103 also have a function of starting print job transfer in accordance with an instruction from the schedulers of the network printers 104 and 105.

Each of the network printers 104 and 105 serves as an image forming apparatus that is a physical apparatus for receiving a print job from the clients (computers) 101 to 103 and analyzing and printing the received print job. Print processing here includes not only simple processing of printing data on a printing medium such as a paper sheet and discharging the printed sheet but also various kinds of working processes such as punching and stapling at the discharge of the printed medium. That is, "print processing" is used in a sense of so-called "output processing".

The network printers 104 and 105 include image forming apparatuses of every type such as a laser beam printer using electrophotography, an inkjet printer using an inkjet method, and a printer using a thermal transfer method.

The network printers 104 and 105 have a function of receiving print requests from the plurality of clients (computers) 101 to 103, deciding the order of received print requests, and issuing a print instruction. The network printers 104 and 105 also have a function of monitoring the statuses of themselves and print jobs transferred to them and notifying the clients (computers) 101 to 103 of an end of printing or a print processing state.

Communication between the apparatuses included in the print system 100 can be either wired communication using an Ethernet® cable or wireless communication using a radio wave or light.

<2. Hardware Configuration of Clients 101 to 103>

FIG. 2 is a block diagram for explaining the hardware configuration of each of the clients (computers) 101 to 103 shown in FIG. 1.

Referring to FIG. 2, a CPU 200 is a control unit which reads out an application program, printer driver program, OS, and print control program from an HD (Hard Disk) 205 and executes them. The CPU 200 also controls to temporarily store, in a RAM 202, information and files necessary for executing the programs.

A ROM 201 is a storage medium which stores programs such as a basic I/O program, and various kinds of data such as font data and template data to be used in document processing. The RAM 202 is a temporary storage medium which functions as the main memory or work area of the CPU 200.

An FD (Floppy® Disk) drive 203 is a storage medium read unit for loading, in the computer system, a program or the like stored in an FD 204 serving as a storage medium. The clients (computers) 101 to 103 may have another storage medium read unit in place of or in addition to the FD drive 203. Other storage medium read unit includes computer-readable storage media of every type such as a CD-ROM, CD-R, CD-RW, PC card, DVD, IC memory card, MO, and memory stick.

The HD 205 is an external storage medium which functions as a mass memory and stores various kinds of programs such as an application program, printer driver program, OS, and print control program.

A keyboard 206 is an instruction input unit which is used by a user to input a command such as a device control command to the clients 101 to 103.

A display 207 is a display unit which displays, for example, a command input via the keyboard 206 and the statuses of the network printers 104 and 105. Actually, a display instruction is input to the display 207 via the OS running on the clients (computers) 101 to 103. The print control program instructs the OS to display a resource file, thereby implementing various user interfaces to be described later.

A system bus 208 controls the flow of data in the computer serving as the clients (computers) 101 to 103.

An interface 209 is an input/output unit. Each of the clients 101 to 103 transmits/receives data to/from another apparatus on the network 106 via the interface 209.

<3. Memory Maps of RAM 202 and FD 204>

Figure 3:
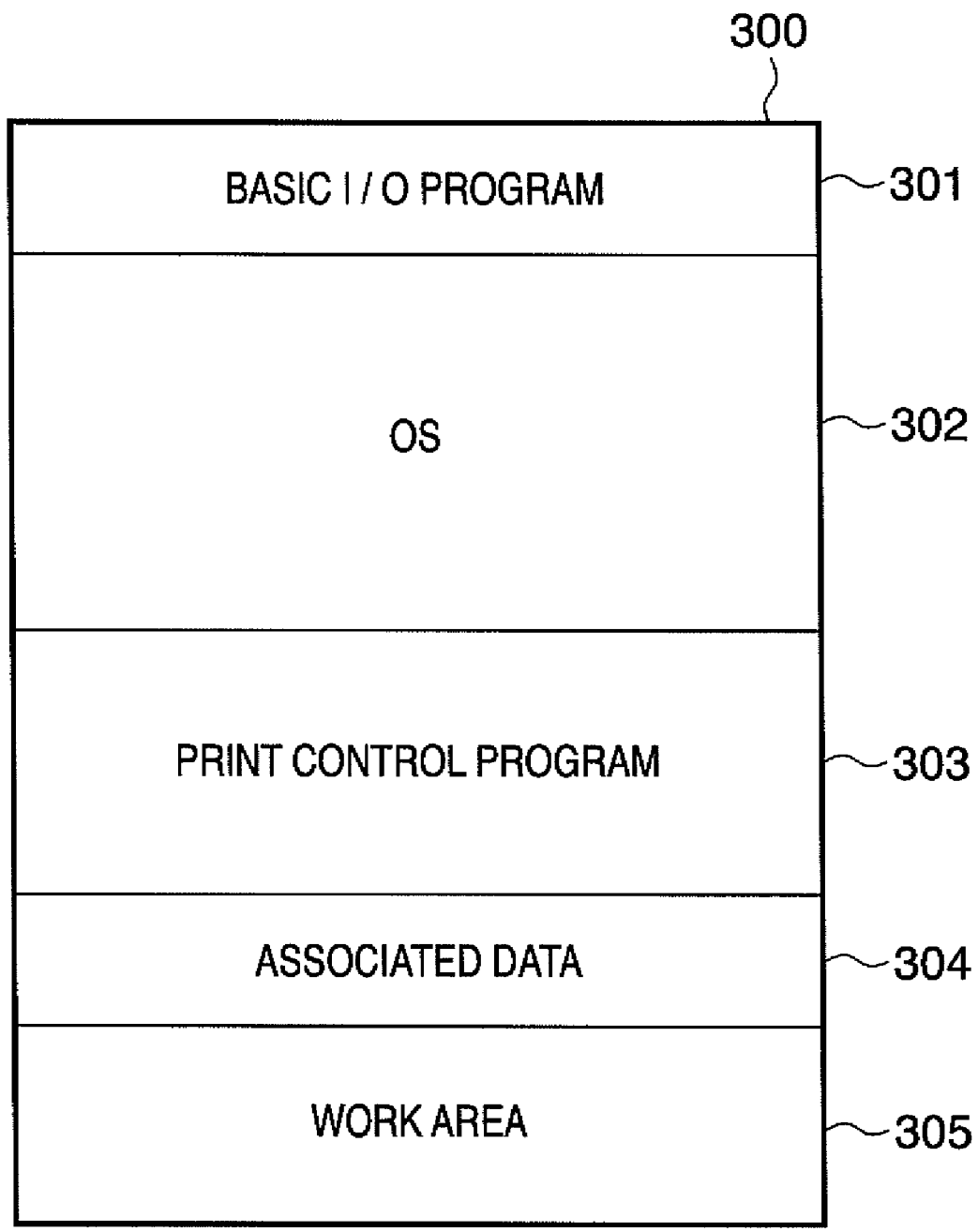
FIG. 3 is a view showing an example of the memory map of a RAM 202.

FIG. 3 is a view showing an example of the memory map of the RAM 202 shown in FIG. 2. FIG. 3 shows a memory map when the print control program is loaded in the RAM 202 in an executable state.

The print control program and associated data are installed from the FD 204 in the HD 205 in advance and loaded from the HD 205 in the RAM 202. Alternatively, the print control program and associated data may directly be loaded from the HD 205 in the RAM 202 and executed. The print control program may be stored in the ROM 201 as a part of a memory map and directly executed by the CPU 200. Software for implementing the same functions as those of the above-described devices is also usable in place of the hardware devices.

The print control program executes control to transfer print data, instruct change of a print job transmission destination, or instruct change of a print order.

An area 301 stores a basic I/O program. The basic I/O program has, for example, an IPL (Initial Program Loading) function. When each of the clients (computers) 101 to 103 is powered on, the IPL function loads the OS from the HD 205 in the RAM 202 and starts the operation of the OS.

An area 302 stores an OS (Operating System). An area 303 stores a print control program. An area 304 stores associated data. A work area 305 is used by the CPU 200 to execute various kinds of programs.

Figure 4:
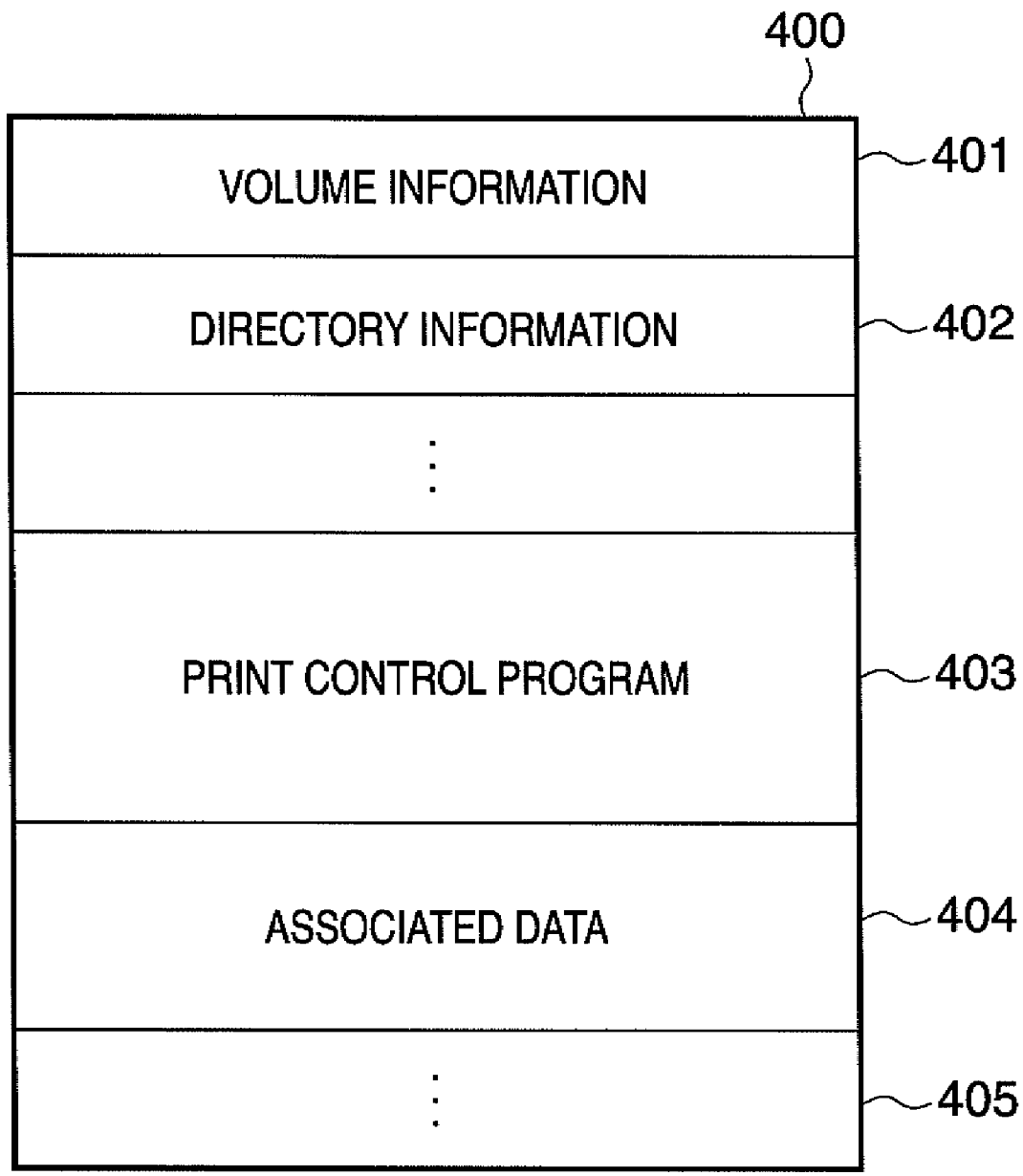
FIG. 4 is a view showing an example of the memory map of an FD 204.

FIG. 4 is a view showing an example of the memory map of the FD 204 shown in FIG. 2. Referring to FIG. 4, reference numeral 400 denotes data contents of the FD 204. The FD 204 contains volume information 401 representing the information of data, directory information 402, print control program 403, and its associated data 404.

<4. Hardware Configuration of Network Printers 104 and 105>

Figure 5:
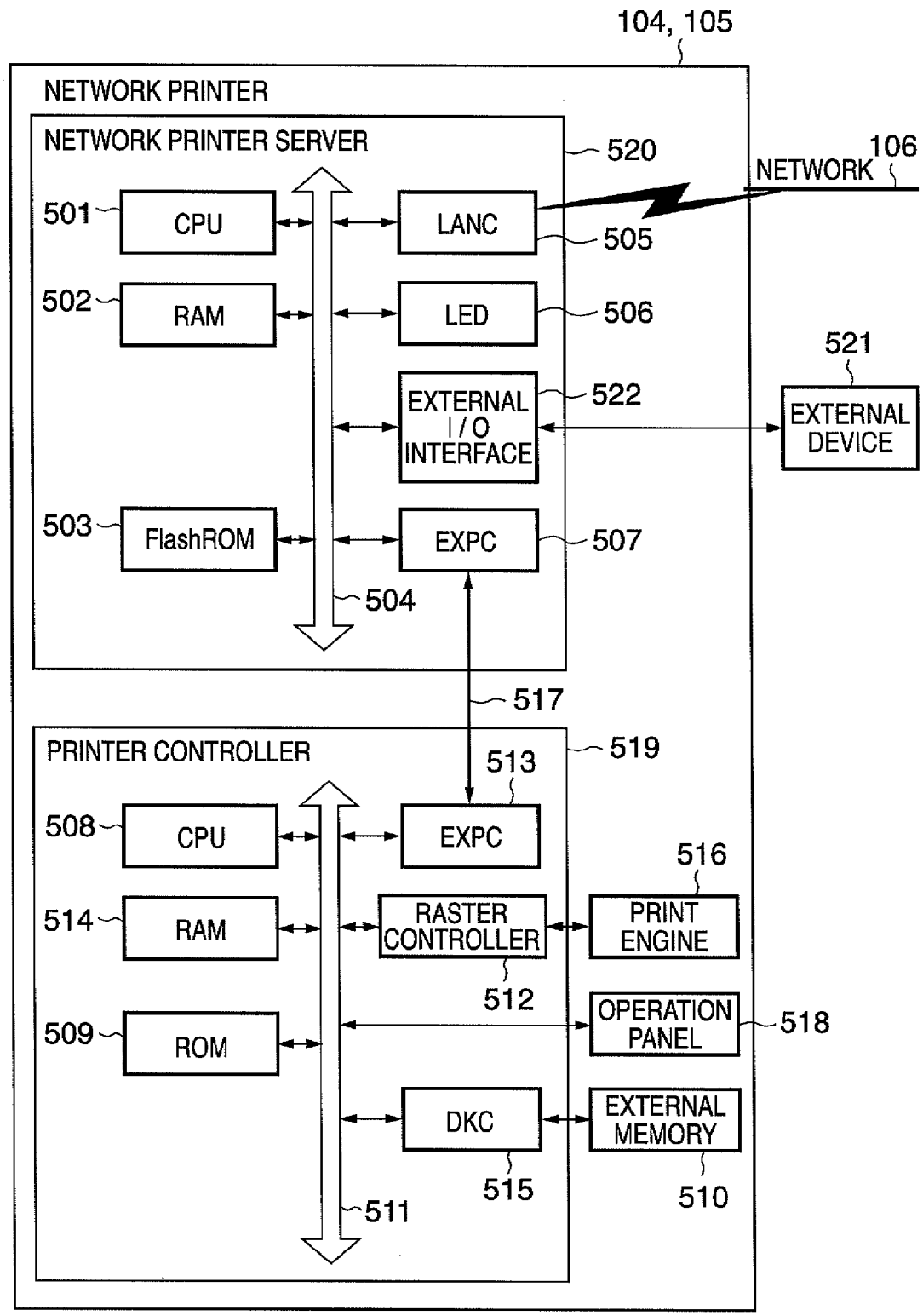
FIG. 5 is a block diagram for explaining the hardware configuration of each of network printers 104 and 105.

FIG. 5 is a block diagram for explaining the hardware configuration of each of network printers 104 and 105.

As shown in FIG. 5, each of the network printers 104 and 105 includes a network print server 520 and a printer controller 519, that is, devices that implement two different control systems.

The network print server 520 has a network print server CPU 501. The network print server CPU 501 operates based on a control program stored in a rewritable Flash ROM 503.

More specifically, the network print server CPU 501 communicates, via a network controller (LANC 505) connected to a system bus 504, with the clients 101 to 103 (not shown in FIG. 5) connected to the network 106 by using a predetermined network communication protocol. The network print server CPU 501 generally controls print jobs transmitted from the clients 101 to 103 and executes appropriate data transfer control for the printer controller 519 connected via an extended interface controller (EXPC 507).

A RAM 502 serves as a temporary storage area such as the main memory or work area of the network print server CPU 501.

An LED 506 serves as an indicator representing an operation state of the network print server 520. More specifically, the LED 506 represents, by a blinking pattern or a color, various operation states such as a network communication mode (10Base, 100Base, full-duplex, or half-duplex) and the electrical connection state (LINK) between the network controller (LANC 505) and the network 106.

An external I/O interface 522 exchanges information with an external device 521.

An extended interface 517 that connects the network print server 520 to the printer controller 519 is formed from a connector (not shown). This allows removing only the network print server 520 and attach the removed network print server 520 to another network printer having the same configuration.

The printer controller 519 has a printer controller CPU 508. The printer controller CPU 508 operates based on, for example, a control program stored in a ROM 509, or a control program and resource data (resource information) stored in an external memory 510 connected via a disk controller (DKC 515).

More specifically, the printer controller CPU 508 generally controls access to various devices connected to a system bus 511. The printer controller CPU 508 also causes a raster controller 512 to generate output image information based on print data received from the network print server 520 connected via an extended interface controller (EXPC 513) and outputs an image signal to a print engine 516.

A RAM 514 serves as the main memory or work area of the printer controller CPU 508. The RAM 514 is designed to be able to expand the memory capacity by an optional RAM connected to an expansion port (not shown).

An operation panel 518 has buttons to perform an operation of setting the operation modes of the network printers 104 and 105 or canceling print data, and display unit such as a liquid crystal panel and LEDs representing the operation states of the network printers 104 and 105.

The print engine 516 shown in FIG. 5 uses a known print technology. As preferred embodiments, for example, electrophotography (laser beam method), inkjet method, and sublimation (thermal transfer) method are usable.

<5. Software Configuration of Clients 101 to 103>

Figure 6:
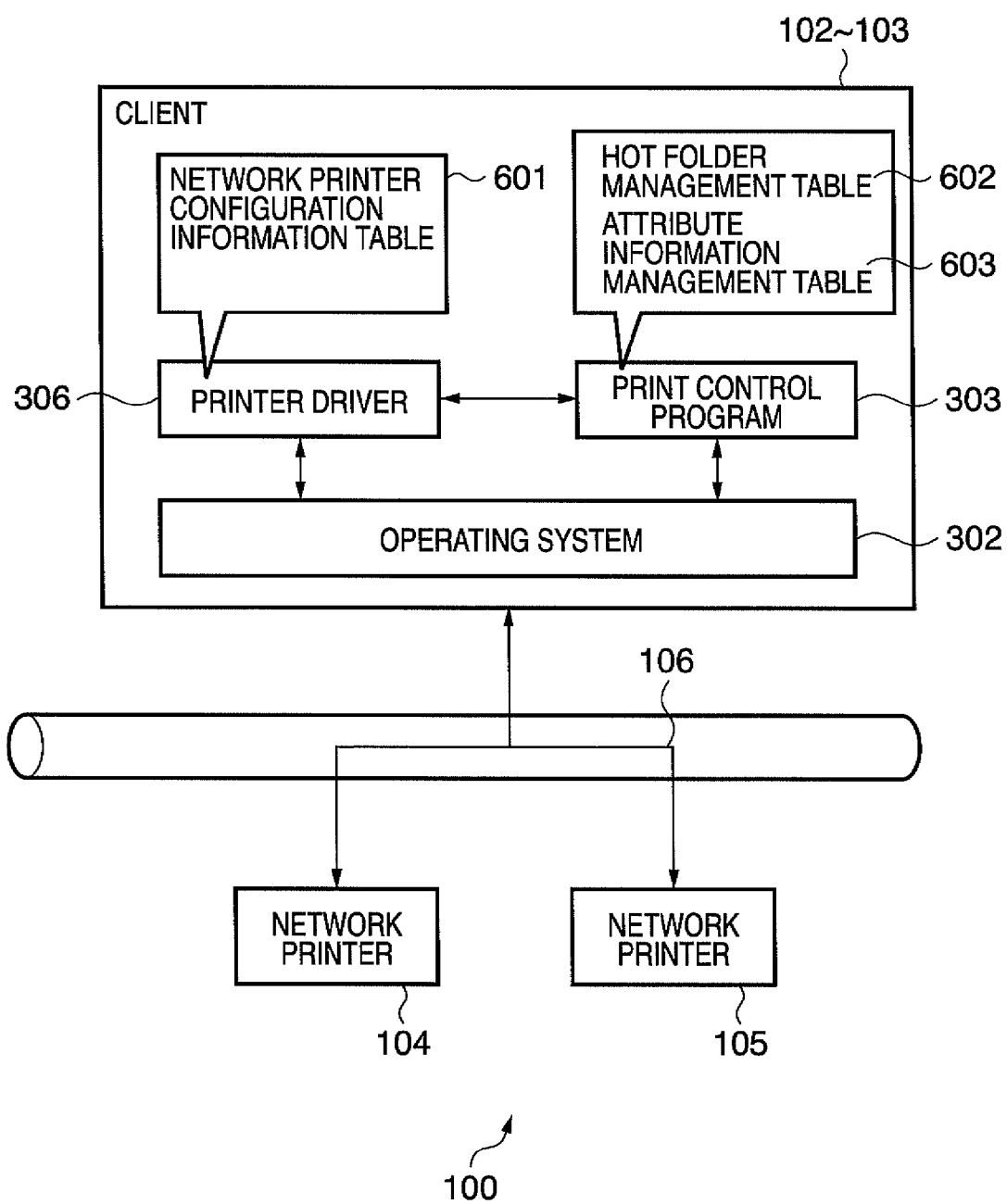
FIG. 6 is a block diagram for explaining the software configuration of each of the clients 101 to 103 in the print system 100.

FIG. 6 is a block diagram for explaining the software configuration of each of the clients 101 to 103 in the print system 100.

The OS (Operating System) 302 is loaded in the RAM 202 of the client. The print control program 303 is loaded in the RAM 202 of the client.

A printer driver 306 that manages the network printers 104 and 105 is loaded in the RAM 202 of the client.

In this embodiment, the printer driver 306 manages a network printer configuration information table 601 (to be described later in detail) which records the configuration information of the network printers 104 and 105. The configuration information of the network printers 104 and 105 indicates information (process contents) related to print processing executable by the network printers and contains, for example, a paper size and a printing method.

The printer driver 306 can acquire the configuration information of the network printer 104 or 105 via the operating system 302, interface 209, and network 106. The printer driver 306 can also update the network printer configuration information table 601 under control.

Upon updating the network printer configuration information table 601, the printer driver 306 notifies the print control program 303 of the update.

On the other hand, the print control program 303 manages, in a hot folder management table 602, information about hot folders set via the print control program 303. The print control program 303 also manages, in an attribute information management table 603, attribute information described in job tickets associated with the set hot folders. Attribute information here indicates information that defines print processing to be executed by a client, and more specifically, information that defines, for example, the size of paper to be printed and a printing method.

As described above, in this embodiment, it is determined using the printer driver 306 whether a network printer set as a hot folder transmission destination can appropriately execute print processing complying with attribute information described in a job ticket.

However, the present invention is not limited to this. For example, the print control program 303 may manage the network printer configuration information table and determine whether a network printer set as a transmission destination can appropriately execute print processing complying with attribute information described in a job ticket. Alternatively, the determination may be done using a system without the printer driver 306.

The above-described job ticket indicates a file that describes attribute information related to print processing to be executed by a network printer. The job ticket is held in association with a set hot folder.

<6. Module Configuration of Print Control Program 303>

The module configuration of the print control program 303 according to the first embodiment of the present invention will be described next.

Figure 7:
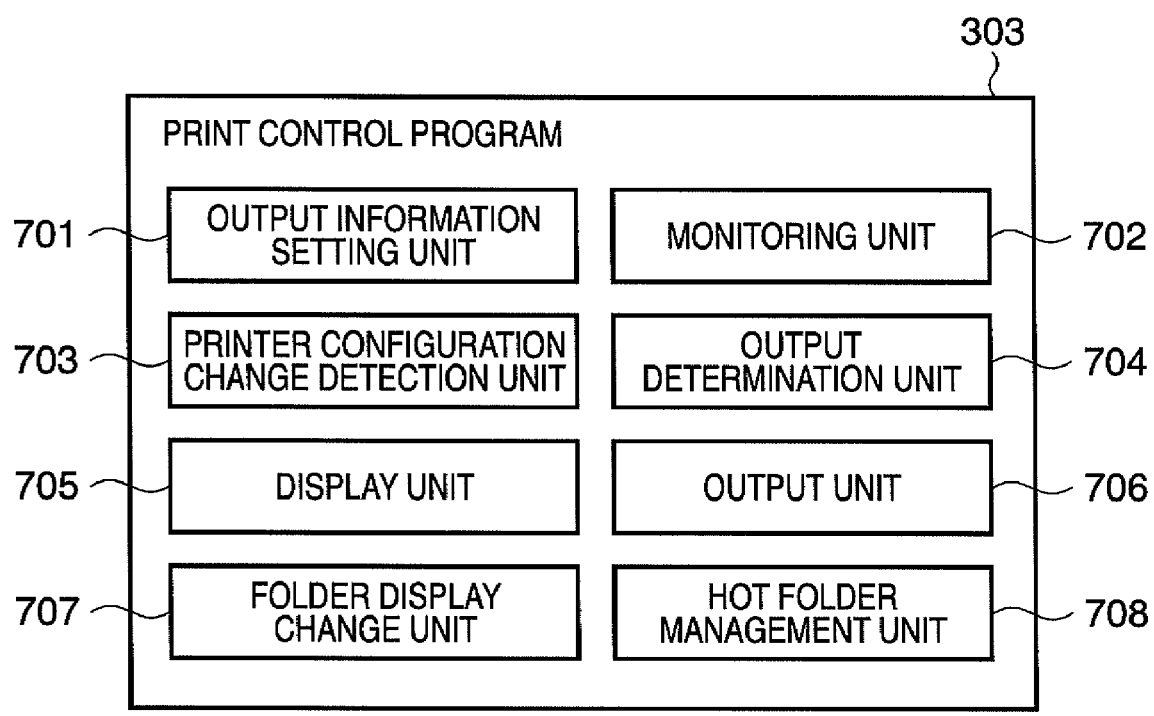
FIG. 7 is a block diagram showing an example of the module configuration of a print control program 303.

FIG. 7 is a block diagram showing an example of the module configuration of the print control program 303.

An output information setting unit 701 has a function of setting, in a hot folder, for example, a folder name on the file system of the operating system 302, information about a transmission destination, a job ticket name to be associated, and operation contents in a print processing disable state.

In setting a hot folder, a display unit 705 displays, via the operating system 302, a setting window ("hot folder setting window" to be described later in detail with reference to FIG. 8) on the display 207 to set a hot folder. The display unit 705 also displays a setting window ("attribute change window" to be described later in detail with reference to FIG. 9) to set attribute information to be described in a job ticket associated with the hot folder.

A monitoring unit 702 has a function of monitoring hot folders to detect electronic data put in a folder set as a hot folder by the output information setting unit 701.

In monitoring hot folders, that new electronic data has been put is detected by periodically confirming a file list in a hot folder. Alternatively, monitoring may be done by detecting an event that takes place at the time of putting electronic data. Electronic data put in a hot folder indicates print data to be printed by the network printer 104 or 105 and, for example, document data created by, for example, a document creation application.

A printer configuration change detection unit 703 has a function of detecting that the configuration of the network printer 104 or 105 has changed due to connection or disconnection of an optional device.

To detect a change in the configuration of the network printer 104 or 105, configuration information is acquired from the network printer 104 or 105 at a predetermined interval. Alternatively, a configuration change notification from the network printer 104 or 105 may be detected. An event notification that is sent when the printer driver 306 has acquired network printer configuration information may be detected.

An output determination unit 704 has a function of determining whether the network printer 104 or 105 set as a transmission destination in a hot folder can appropriately execute print processing complying with attribute information described in a job ticket.

Whether print processing is executable or not is determined by, for example, comparing the configuration information of the network printer 104 or 105 with the attribute information described in the job ticket. Alternatively, the printer driver 306 may be caused to determine by setting, in the printer driver 306, the attribute information described in the job ticket. Any other method is usable for the determination.

If the output determination unit 704 determines that print processing is not executable, attribute information that does not allow execution can be displayed in, for example, an attribute information list display window (to be described later in detail with reference to FIG. 10). It is also possible to display another network printer capable of executing print processing in a "network printer list display window" (to be described later in detail with reference to FIG. 11).

The display unit 705 has a function of displaying a user interface of the print control program 303 on the display 207 via the operating system 302. Examples of the user interface are the above-described hot folder setting window, attribute change window, attribute information list display window, and network printer list display window.

An output unit 706 has a function of transmitting a job ticket to the network printer 104 or 105 via the interface 209 and causing the network printer to execute print processing.

A folder display change unit 707 has a function of changing the display form, on the file system of the operating system 302, of the icon of a folder set as a hot folder.

A hot folder management unit 708 has a function of managing information related to a hot folder, which is set by the output information setting unit 701, by using the hot folder management table 602 (to be described later in detail with reference to FIG. 12). The hot folder management unit 708 also has a function of managing attribute information described in a job ticket associated with the hot folder by using the attribute information management table 603 (to be described later in detail with reference to FIG. 9).

<7. User Interface of Print Control Program>

Examples of the user interface displayed on the display 207 by the display unit 705 of the print control program 303 will be described next.

<7.1 Hot Folder Setting Window>

Figure 8:
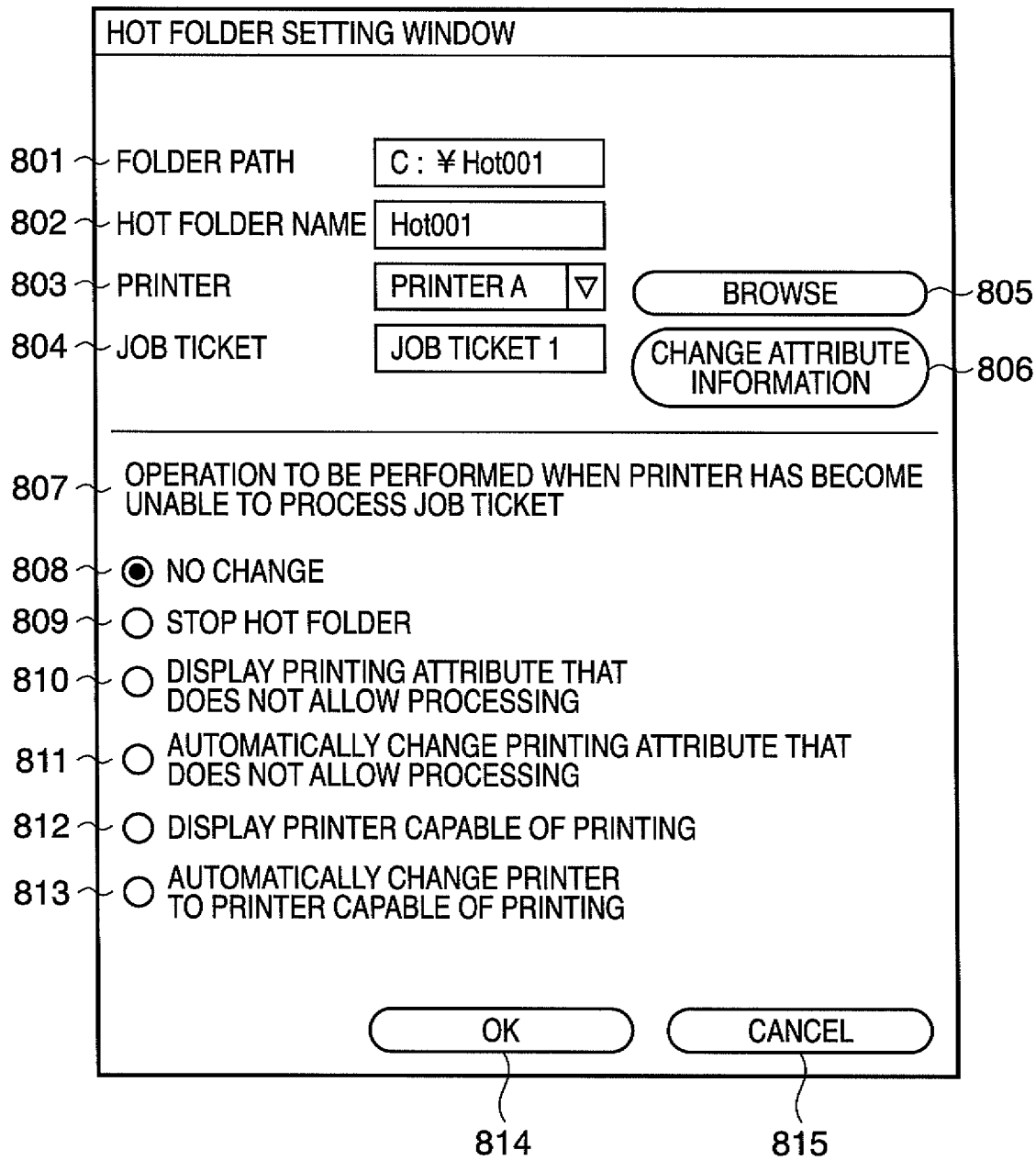
FIG. 8 is a view showing an example of a hot folder setting window.

FIG. 8 is a view showing an example of a hot folder setting window.

A folder path input field 801 sets a folder path to designate a folder on the operating system 302.

A hot folder name input field 802 sets the name of a hot folder to be used on the print control program 303.

A printer name input field 803 is used to select a network printer of a transmission destination. The network printer displayed in the printer name input field 803 can be either a network printer registered in the operating system 302 or a network printer registered by another system. The printer name input field 803 may be designed to add a new network printer.

A job ticket input field 804 sets a job ticket name. The user can designate a job ticket on the file system of the operating system 302 by pressing a browse button 805. This associates the job ticket with the hot folder.

An attribute information change button 806 displays a user interface (attribute change window) to set attribute information to be described in the job ticket.

The user selects a radio button in a selection area 807. Each radio button defines an operation to be performed in the client when the network printer has become unable to appropriately execute print processing complying with the attribute information described in the job ticket due to a change in the network printer configuration information.

A radio button 808 sets not to change the attribute information described in the job ticket associated with the hot folder even when the network printer has become unable to execute print processing complying with the attribute information.

A radio button 809 sets to exclude the hot folder from the monitoring targets of the monitoring unit 702 and stop print job transmission from the hot folder when the network printer has become unable to execute print processing complying with the attribute information.

A radio button 810 sets to display, on the display 207, attribute information that does not allow processing by the network printer when the network printer has become unable to execute print processing complying with the attribute information.

A radio button 811 sets to automatically change the attribute information to allow the network printer 104 or 105 to execute print processing when the network printer has become unable to execute print processing complying with the attribute information.

A radio button 812 sets to display, on the display 207, a network printer capable of executing print processing complying with the attribute information described in the job ticket when the designated network printer has become unable to execute print processing complying with the attribute information. This display is done in the "network printer list display window".

A radio button 813 sets to automatically change the transmission destination to a network printer capable of executing print processing complying with the attribute information described in the job ticket when the designated network printer has become unable to execute print processing complying with the attribute information.

An OK button 814 determines the settings of the hot folder. If the network printer input to the printer name input field 803 cannot execute processing complying with the attribute information described in the job ticket set in the job ticket input field 804, pressing the OK button 814 may be inhibited. Alternatively, after the user presses the OK button 814, attribute information that does not allow processing may be displayed to prompt the user to change it.

A button 815 cancels hot folder settings.

<7.2 Attribute Change Window>

Figure 9:
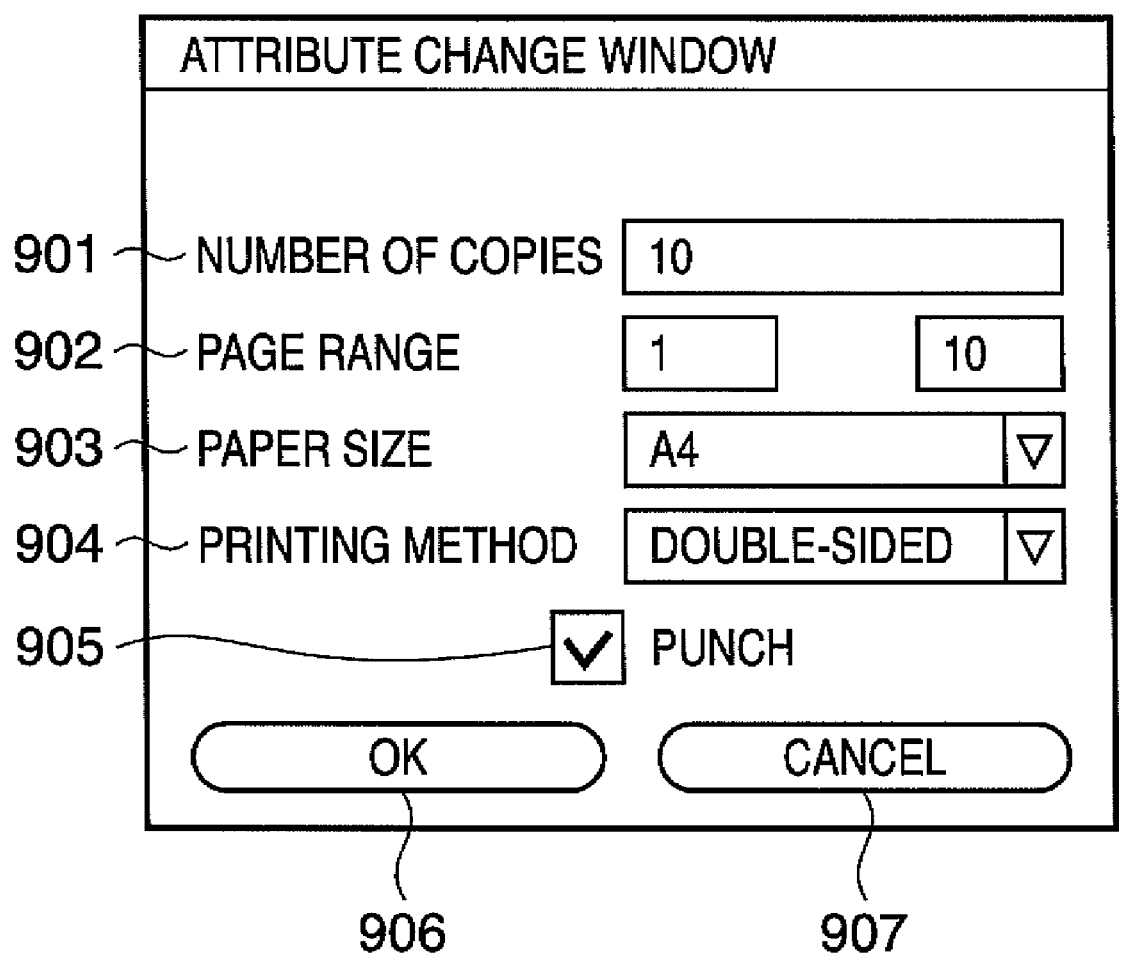
FIG. 9 is a view showing an example of an attribute change window.

FIG. 9 shows an example of an attribute change window invoked upon pressing the attribute information change button 806.

A copy count input field 901 designates the number of printed copies of electronic data. A page range input field 902 designates the range of pages to be printed of the print target electronic data.

A paper size input field 903 designates the size of paper sheets to be used for printing of the electronic data.

In a printing method input field 904, the user selects and inputs one of printing methods such as single-sided printing, double-sided printing, saddle stitch printing, and case binding printing.

A punch check box 905 is used to set whether to punch the printed paper sheets.

An OK button 906 determines the settings of the attribute information. When the user presses the OK button 906, the attribute information described in the job ticket set in the job ticket input field 804 is updated.

A cancel button 907 cancels attribute information settings.

<7.3 Attribute Information List Display Window>

A user interface displayed when, during hot folder monitoring, the network printer cannot execute print processing complying with the attribute information described in the job ticket due to a change in the configuration information will be described next.

When the network printer has become unable to execute print processing complying with the attribute information, and the above-described radio button 810 in the selection area 807 has a check mark, the print control program 303 displays an attribute information list display window on the display 207 via the display unit 705.

Figure 10:
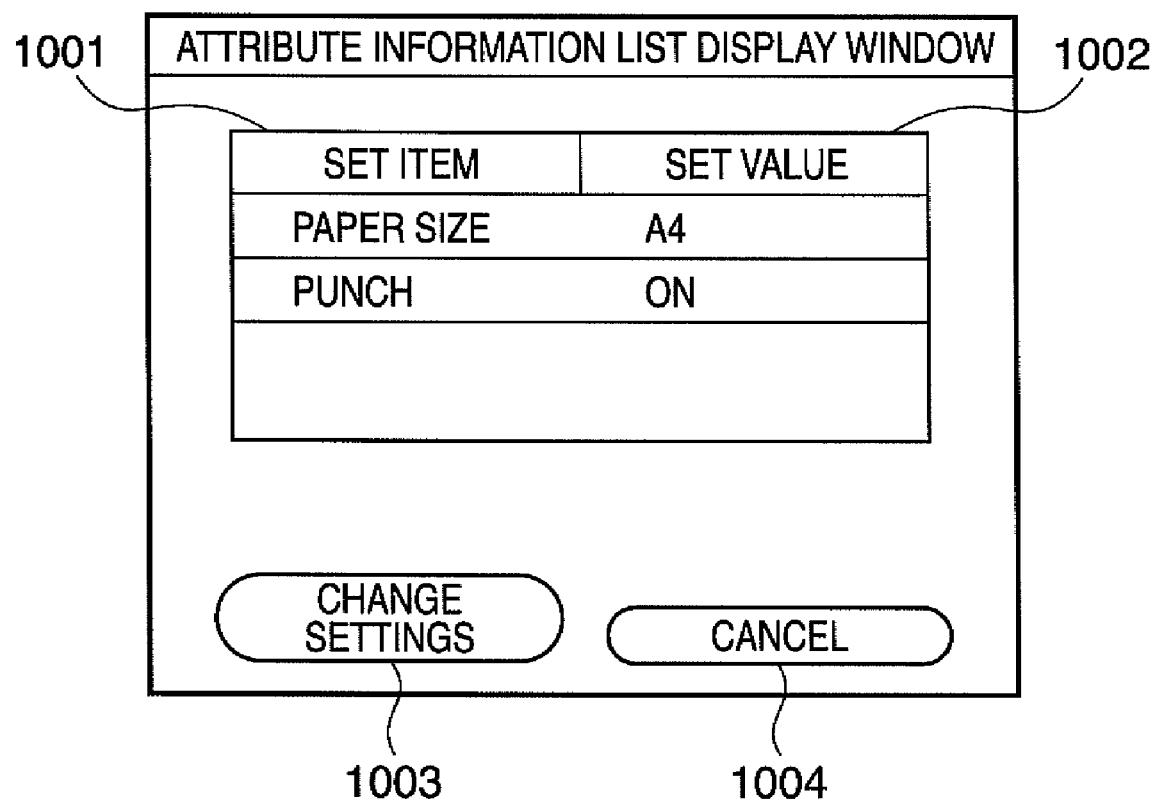
FIG. 10 is a view showing an example of an attribute information list display window.

FIG. 10 shows an example of the attribute information list display window which displays attribute information that does not allow print processing by the network printer.

A set item display field 1001 displays the set items of attribute information, which do not allow print processing. A set value display field 1002 displays the set values of attribute information described in a job ticket in correspondence with the set items which do not allow execution of print processing.

Reference numeral 1003 denotes a setting change button. When the user presses the setting change button 1003, the attribute change window shown in FIG. 9 is displayed.

Reference numeral 1004 denotes a cancel button. When the user presses the cancel button 1004, the attribute information list display window is closed. Upon closing the attribute information list display window, the hot folder monitoring and the function of transmitting a print job from the hot folder to the network printer may be stopped. Alternatively, the hot folder setting window shown in FIG. 8 may be displayed.

<7.4 Network Printer List Display Window>

Another user interface displayed when, during hot folder monitoring, the network printer has become unable to execute print processing complying with the attribute information described in the job ticket due to a change in the configuration information will be described next.

When the network printer has become unable to execute print processing complying with the attribute information, and the above-described radio button 812 in the selection area 807 has a check mark, the print control program 303 displays a network printer list display window on the display 207.

Figure 11:
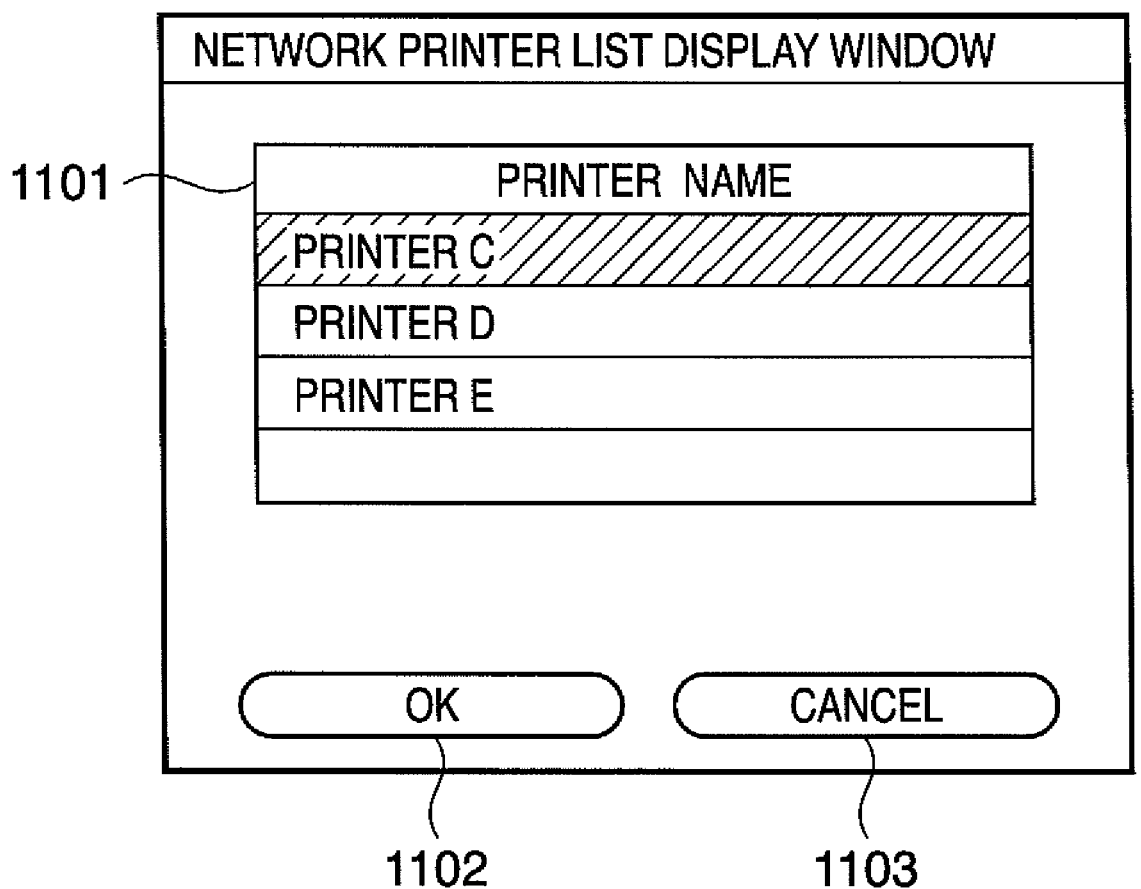
FIG. 11 is a view showing an example of a network printer list display window.

FIG. 11 shows an example of the network printer list display window. A list display field 1101 displays the names of network printers capable of executing print processing complying with the attribute information described in the job ticket set in the hot folder.

Reference numeral 1102 denotes an OK button. When the user presses the OK button 1102, the hot folder transmission destination changes to a selected one of the network printers displayed in the list display field 1101.

Reference numeral 1103 denotes a cancel button. When the user presses the cancel button 1103, the network printer list display window is closed.

Upon closing the network printer list display window that displays network printers capable of executing print processing, the hot folder monitoring and the function of transmitting a print job from the hot folder to the network printer may be stopped. Alternatively, the hot folder setting window shown in FIG. 8 may be displayed.

<8. Explanation of Various Tables>
<8.1 Hot Folder Management Table>

The hot folder management table 602 which manages hot folders set via the hot folder setting window (FIG. 8) will be described next.

FIG. 12 is a view showing an example of the hot folder management table 602. Referring to FIG. 12, a hot folder name storage field 1201 holds hot folder names set in the hot folder name input field 802.

A printer name storage field 1202 holds network printer names input to the printer name input field 803 in association with the hot folder names.

A status storage field 1203 holds information about the current statuses of the hot folders. In this embodiment, "normal" is input to the status storage field 1203 for a hot folder without any particular abnormality.

If a network printer set in a hot folder cannot appropriately execute print processing complying with attribute information described in a job ticket associated with the hot folder, "print disable" is input to the status storage field 1203.

If the user who has logged in to the operating system 302 has no access authority to a folder set as a hot folder, "access rejected" is input to the status storage field 1203. If the configuration information of a network printer set in the printer name input field 803 cannot be acquired, "printer unknown" is input to the status storage field 1203.

If a file corresponding to the job ticket set in the job ticket input field 804 is not found or is broken, or the contents of the job ticket lack necessary information, "job ticket unknown" is input to the status storage field 1203.

If electronic data and a job ticket put in the hot folder are being transferred as a print job to a network printer set as a transmission destination in the hot folder, "in printing" is input to the status storage field 1203. When the network printer is processing the print job, "in printing" is input to the status storage field 1203 as well.

If a folder set as a hot folder is not found because, for example, it was deleted from the file system of the operating system, "folder unknown" is input to the status storage field 1203.

A folder path storage field 1204 holds folder paths on the file system of the operating system, which are designated in the folder path input field 801.

A job ticket name storage field 1205 holds job ticket names input to the job ticket input field 804.

Reference numeral 1206 denotes an operation storage field. The operation storage field 1206 holds operations which are selected in the selection area 807 and should be performed when a network printer has become unable to execute print processing complying with attribute information described in job tickets due to a change in the network printer configuration information.

The hot folder management table may be held on a memory of a client or saved in a file. The hot folder management table may be held using, for example, a database or any other unit.

<8.2 Attribute Information Management Table>

The attribute information management table 603 which manages attribute information set via the attribute change window (FIG. 9) will be described next. FIG. 13 is a view showing an example of the attribute information management table 603.

Fields 1301, 1303, 1305, 1307, and 1309 manage the set items of attribute information.

Information about the number of printed copies set in the copy count input field 901 is input to a field 1302. In this embodiment, "10 copies" is set.

Information about a page range of printing set in the page range input field 902 is input to a field 1304. In this embodiment, setting is done to print "pages 1-10".

Information about a paper size set in the paper size input field 903 is input to a field 1306. In this embodiment, "A4" is set.

Information about a printing method set in the printing method input field 904 is input to a field 1308. In this embodiment, setting is done to execute "double-sided printing".

Information representing whether to punch paper sheets, which is set in the punch check box 905, is input to a field 1310. In this embodiment, "punch" (ON) is set.

<8.3 Network Printer Configuration Information Table>

The network printer configuration information table 601 managed by the printer driver 306 will be described next. FIG. 14 is a view showing an example of the network printer configuration information table 601.

The item names of network printer configuration information are input to fields 1401, 1403, and 1405.

Network printer configuration information about paper sizes is input to a field 1402. Paper sizes usable for print processing by the network printer are listed. In this embodiment, A3, A4, B4, and B5 are usable.

Network printer configuration information about printing methods is input to a field 1404. Printing methods usable for print processing by the network printer are listed. In this embodiment, single-sided printing and double-sided printing are usable.

Information representing whether the network printer can punch paper sheets is input to a field 1406. In this embodiment, the network printer cannot punch paper sheets.

<9. Sequence (Overall Sequence) of Processing in Client>

The sequence of processing of the print control program 303 in a client when network printer configuration information has changed will be described next.

Figure 15A:
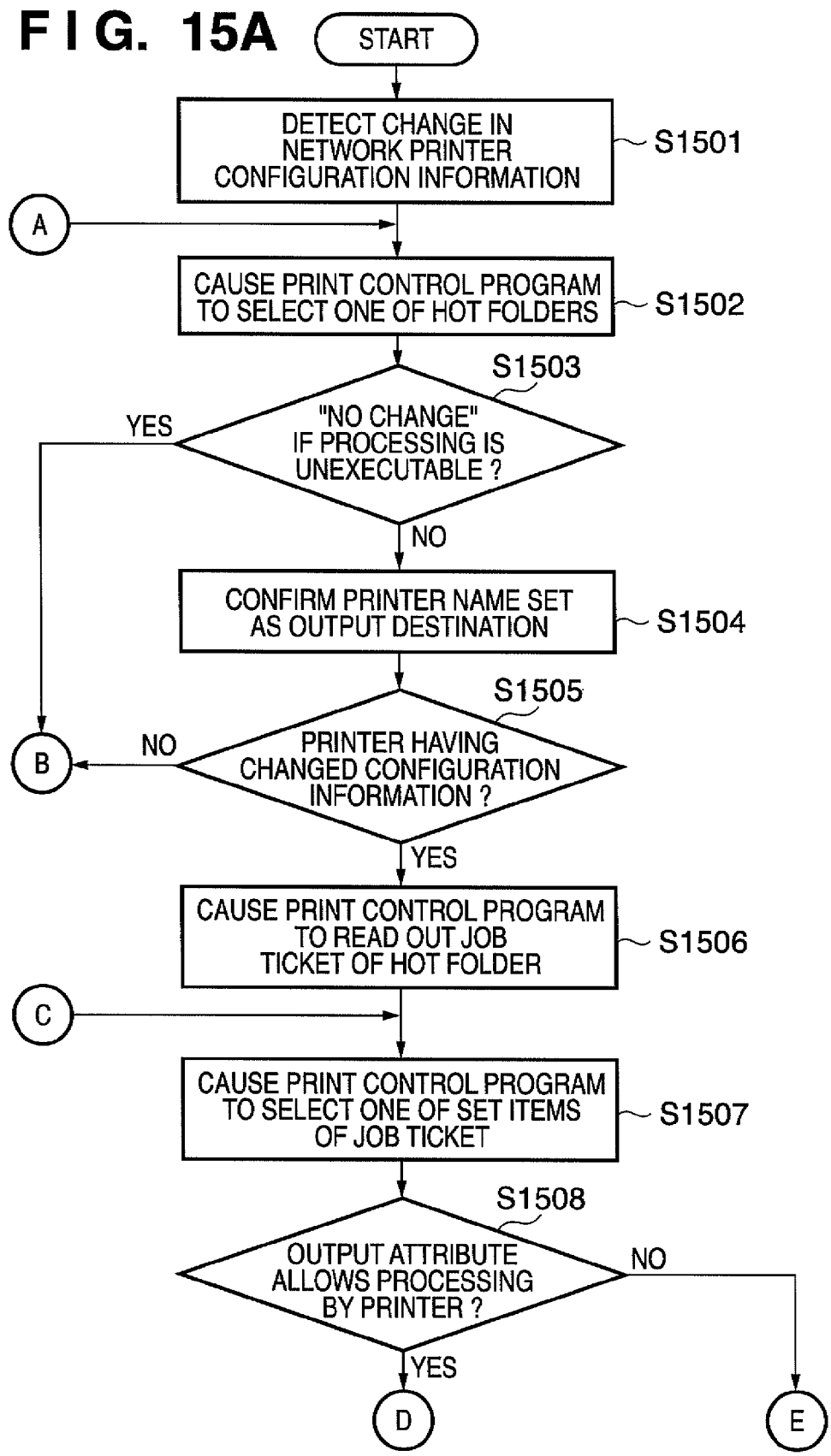
FIG. 15A is a flowchart illustrating the sequence of processing of the print control program 303 in a client.

FIGS. 15A and 15B are flowcharts illustrating the sequence of processing of the print control program 303 in a client.

When the printer driver 306 notifies the print control program 303 that network printer configuration information has changed, the printer configuration change detection unit 703 detects it in step S1501. This triggers off the following processing.

Note that the printer driver 306 can update network printer configuration information in the network printer configuration information table 601 at any timing. For example, a configuration information update button is arranged on a network printer property window displayed by the printer driver 306 to update the network printer configuration information at a timing designated by the user. Alternatively, the network printer configuration information may be updated periodically.

Note that regarding the notification from the printer driver 306 to the print control program 303, the print control program 303 as the notification target is registered in advance in the printer driver 306. When the network printer configuration information is updated, the printer driver 306 notifies the registered print control program of it.

For the notification, either the message function or named pipe function of the operating system 302 or interprocess communication using a call back function is usable. Alternatively, the notification may be sent using a network communication function or any other method.

In step S1502, the hot folder management unit 708 of the print control program 303 selects one of hot folders managed in the hot folder management table 602 (FIG. 12). Processing for the selected hot folder is performed from then on.

In step S1503, the output determination unit 704 of the print control program 303 determines operation contents to be performed when the network printer has become unable to execute print processing complying with attribute information described in the job ticket. More specifically, the output determination unit 704 checks the radio button 808 in the selection area 807 and determines whether the operation contents input to the operation storage field 1206 of the hot folder management table 602 (FIG. 12) represent "no change".

If the operation contents input to the operation storage field 1206 represent "no change", the process advances to step S1519. If the operation contents input to the operation storage field 1206 represent processing other than "no change", the process advances to step S1504.

In step S1504, the hot folder management unit 708 of the print control program 303 recognizes a network printer corresponding to the hot folder. More specifically, the hot folder management unit 708 acquires a printer name input to the printer name input field 803 and held in the printer name storage field 1202 of the hot folder management table 602.

In step S1505, the output determination unit 704 of the print control program 303 determines whether the printer name acquired in step S1504 matches the printer name received in step S1501. If the printer names do not match, the process advances to step S1519. If the printer names match, the process advances to step S1506.

In step S1506, the hot folder management unit 708 of the print control program 303 refers to the job ticket name storage field 1205 of the hot folder management table 602 (FIG. 12). The hot folder management unit 708 reads out attribute information described in the job ticket in the job ticket name storage field 1205.

In step S1507, the output determination unit 704 of the print control program 303 selects one of the set items of the readout attribute information. Processing for the selected set item is performed from then on.

In step S1508, the output determination unit 704 of the print control program 303 compares the network printer configuration information received in step S1501 with the attribute information read out in step S1506 in association with the selected set item. The output determination unit 704 thus determines whether the readout attribute information allows print processing by the network printer.

If it is determined in step S1508 that the network printer can execute print processing, the process advances to step S1509. In step S1509, the output determination unit 704 of the print control program 303 determines whether all set items of the attribute information described in the job ticket have undergone the investigation about the possibility of printing. If it is determined in step S1509 that not all set items have been investigated, the process returns to step S1507 to investigate the remaining set items. If it is determined that all set items have been investigated, the process advances to step S1519.

If it is determined in step S1508 that the network printer cannot execute print processing, the process advances to step S1510.

In step S1510, the output determination unit 704 of the print control program 303 determines operation contents to be performed when the network printer has become unable to execute print processing complying with the attribute information described in the job ticket. More specifically, the output determination unit 704 checks one of the radio buttons 809 to 813 except the radio button 808 in the selection area 807 and determines the operation contents stored in the operation storage field 1206 of the hot folder management table 602 (FIG. 12).

If, in step S1510, the output determination unit 704 checks the radio button 810 in the selection area 807 and determines that "display printing attribute list" is input to the operation storage field 1206, the process advances to step S1511.

In step S1511, the display unit 705 of the print control program 303 displays the attribute information list display window (FIG. 10). In displaying the attribute information list display window (FIG. 10), it may be checked whether all set items of the attribute information described in the job ticket allow print processing by the network printer, and set items that do not allow print processing may be displayed.

If, in step S1510, the output determination unit 704 checks the radio button 811 in the selection area 807 and determines that "automatically change printing attribute" is input to the operation storage field 1206, the process advances to step S1512.

In step S1512, the output determination unit 704 changes the attribute information (set item 1001 and set value 1002) described in the job ticket set in the hot folder to attribute information which allows print processing by the network printer.

If, in step S1510, the output determination unit 704 checks the radio button 809 in the selection area 807 and determines that "stop hot folder" is input to the operation storage field 1206, the process advances to step S1513.

In step S1513, the output determination unit 704 of the print control program 303 excludes the hot folder from the monitoring targets of the monitoring unit 702. The output determination unit 704 also stops the function of causing the output unit 706 to transmit the print job from the hot folder to the network printer.

In step S1514, the folder display change unit 707 of the print control program 303 changes the icon display of the folder on the file system of the operating system 302.

Changing the icon display of the folder on the file system of the operating system can be implemented by, for example, placing a special setting file in the folder. However, the change method is not limited to this. The icon display of the folder on the file system of the operating system can be changed by any other method.

Changing the icon display of the folder on the operating system can be implemented by, for example, placing, in the folder, a file such as an ini file related to folder setting information. However, the change method is not limited to this. The change of the icon display of the folder may be instructed by changing the setting information of the operating system or by any other change method.

If, in step S1510, the output determination unit 704 checks the radio button 812 in the selection area 807 and determines that "display printer list" is input to the operation storage field 1206, the process advances to step S1515.

In step S1515, the output determination unit 704 of the print control program 303 searches for a network printer capable of processing all set items of the attribute information described in the job ticket. The search processing in step S1515 will be described later in detail.

In step S1516, the result of search processing in step S1515 is displayed as the network printer list display window (FIG. 11) that displays network printers capable of printing.

If, in step S1510, the output determination unit 704 checks the radio button 813 in the selection area 807 and determines that "automatically change printer" is input to the operation storage field 1206, the process advances to step S1517.

In step S1517, the output determination unit 704 of the print control program 303 searches for a network printer capable of processing all set items of the attribute information described in the job ticket.

In step S1518, the output determination unit 704 of the print control program 303 selects one of the network printers capable of processing all set items of the attribute information and changes the hot folder transmission destination to the selected network printer.

The selected network printer may be either the first network printer found by the network printer search processing or a network printer capable of executing print processing earliest. The network printer can be selected by any other method.

If no network printer capable of processing all set items of the attribute information is found at all by the search processing in step S1517, the processing in steps S1513 and S1514 may be executed. Alternatively, the processing in step S1511 or S1512 may be executed.

In step S1519, the output determination unit 704 of the print control program 303 determines whether all hot folders registered in the hot folder management table 602 have been investigated. If it is determined in step S1519 that not all hot folders have been investigated, the process returns to step S1502.

If it is determined in step S1519 that all hot folders have been investigated, the print control program 303 finishes the processing.

As described above, when the print control program 303 of this embodiment is executed, a change in the network printer configuration information is detected. Upon detecting a change, it is determined whether a network printer set as a transmission destination can execute print processing complying with attribute information described in a job ticket set in a hot folder. If it is determined that print processing is not executable, the transmission function is disabled. This prevents printing errors.

If it is determined that print processing is not executable, monitoring of the hot folder is stopped, and the icon display of the folder on the operating system is changed. This allows the user to recognize that it is not possible to obtain a desired printing result.

If it is determined that print processing is not executable, the attribute information described in the job ticket is displayed to prompt the user to change it. This allows changing the settings of the job ticket in advance.

If it is determined that print processing is not executable, of the set items of attribute information described in the job ticket, set items which do not allow print processing by the network printer are automatically changed to those which allow print processing by the network printer. This saves the user the trouble of changing the attribute information.

If it is determined that print processing is not executable, network printers capable of obtaining a normal printing result using the job ticket are listed to allow the user to select a network printer as the transmission destination. This enables the user to recognize the network printers capable of obtaining a desired printing result.

If it is determined that print processing is not executable, the network printer of the transmission destination is automatically changed to a network printer capable of obtaining a normal printing result using the job ticket. This saves the user the trouble of setting the network printer of the transmission destination.

<10. Sequence of Processing (Search Processing) in Client>

Figure 16:
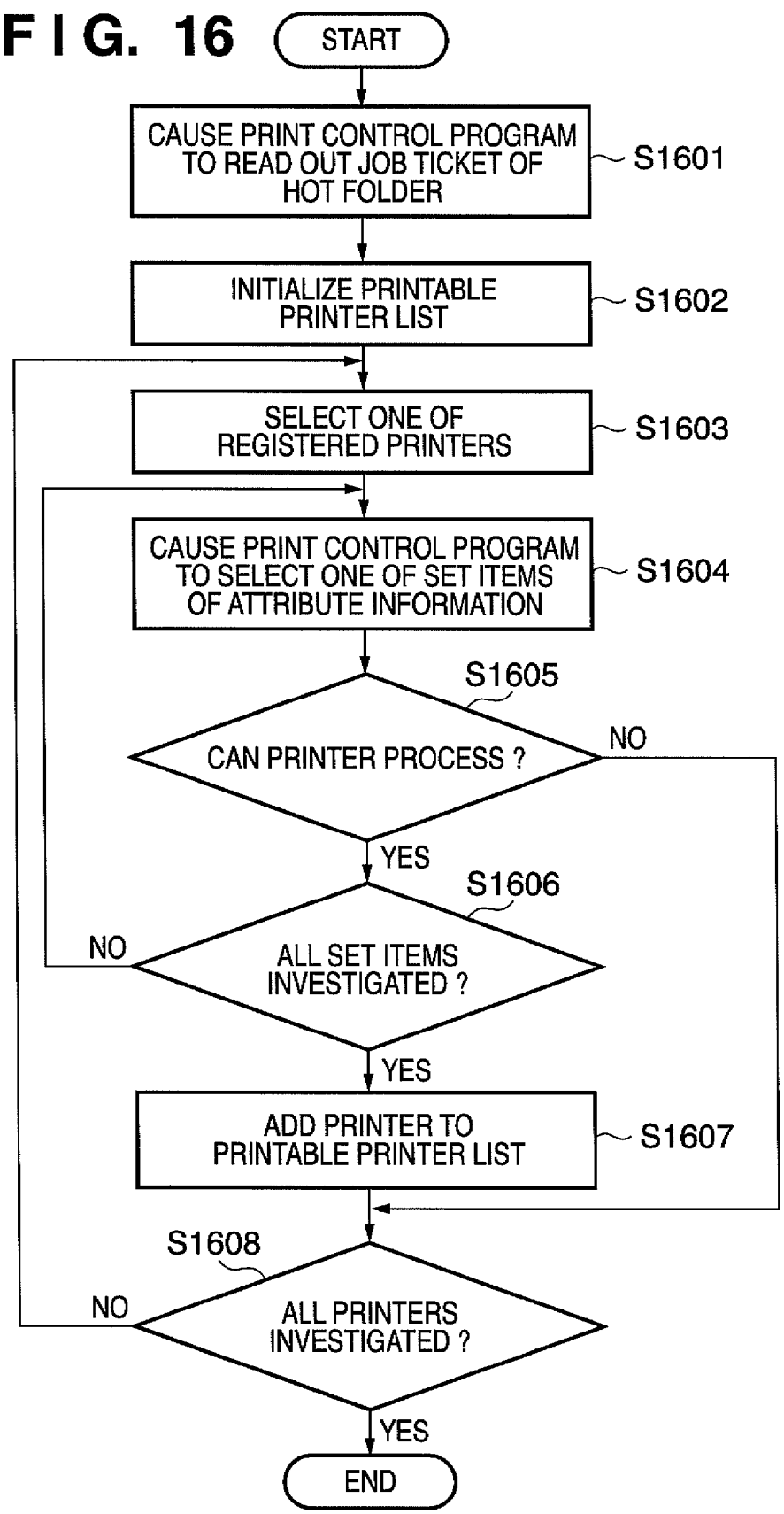
FIG. 16 is a flowchart illustrating the detailed sequence of search processing.

The search processing in step S1515 or S1517 in FIG. 15B will be described next in detail. FIG. 16 is a flowchart illustrating the detailed sequence of search processing.

In step S1601, the hot folder management unit 708 of the print control program 303 reads out attribute information described in the job ticket associated with the target hot folder.

In step S1602, the output determination unit 704 of the print control program 303 initializes the list that manages network printers capable of processing the job ticket.

In step S1603, the output determination unit 704 of the print control program 303 selects one of the network printers managed by the operating system or another system. The output determination unit 704 acquires the configuration information of the selected network printer from the printer driver 306.

In step S1604, the output determination unit 704 of the print control program 303 selects one of the set items of the attribute information read out in step S1601. The output determination unit 704 compares the attribute information read out in step S1601 with the network printer configuration information acquired in step S1603 in association with the selected set item.

In step S1605, the output determination unit 704 determines based on the comparison result in step S1604 whether the selected network printer can execute print processing complying with the attribute information.

If it is determined in step S1605 that the selected network printer cannot execute print processing complying with the attribute information, the output determination unit 704 of the print control program 303 advances to step S1608.

If it is determined in step S1605 that the selected network printer can execute print processing complying with the attribute information, the output determination unit 704 of the print control program 303 advances to step S1606.

In step S1606, the output determination unit 704 determines whether all set items of the attribute information described in the job ticket have undergone the investigation about the possibility of printing by the selected network printer.

If it is determined in step S1606 that not all set items of the attribute information described in the job ticket have been investigated, the process returns to step S1604.

If it is determined in step S1606 that all set items of the attribute information described in the job ticket have been investigated, the process advances to step S1607. In step S1607, the output determination unit 704 of the print control program 303 adds the selected network printer to the list that manages printers capable of printing.

In step S1608, the output determination unit 704 of the print control program 303 determines whether all managed network printers have been checked.

If the output determination unit 704 of the print control program 303 determines in step S1608 that not all managed network printers have been checked, the process returns to step S1603.

If the output determination unit 704 of the print control program 303 determines in step S1608 that all managed network printers have been checked, the process is ended.

The list generated at the end of search processing is used to display the network printer list display window.

In this embodiment, whether a printer can process all set items of the attribute information is determined for all network printers. However, the present invention is not limited to this. For example, when a network printer capable of processing all set items of the attribute information is found, the network printer search processing may be stopped, and only the found network printer may be added to the list.

<11. Icon of Hot Folder>

Changes of the icon of a hot folder will be described. In this embodiment, the icon of a hot folder is designed to change in accordance with a status input to the status storage field 1203 of the hot folder management table 602 (FIG. 12). The change forms of the icon of a hot folder according to a status input to the status storage field 1203 will be described below with reference to FIGS. 17 to 23.

Figure 17:
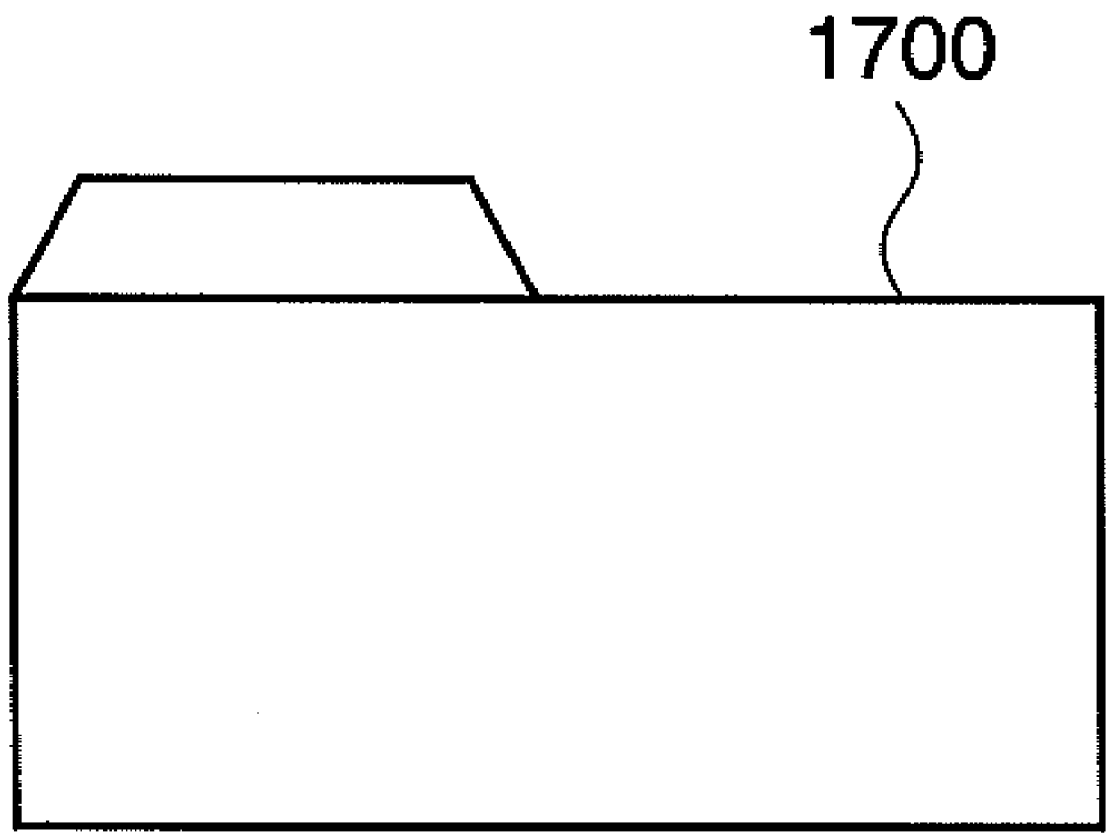
FIG. 17 is a view showing the icon display of a folder in a normal state.

FIG. 17 is a view showing the icon display of a folder on the file system of the operating system and, more specifically, the icon display of a folder in a normal state.

FIG. 18 is a view showing an example of the icon display which is displayed by the folder display change unit 707 of the print control program 303 when the status input to the status storage field 1203 is "print disable". The icon in FIG. 18 is displayed in step S1514.

Figure 19:
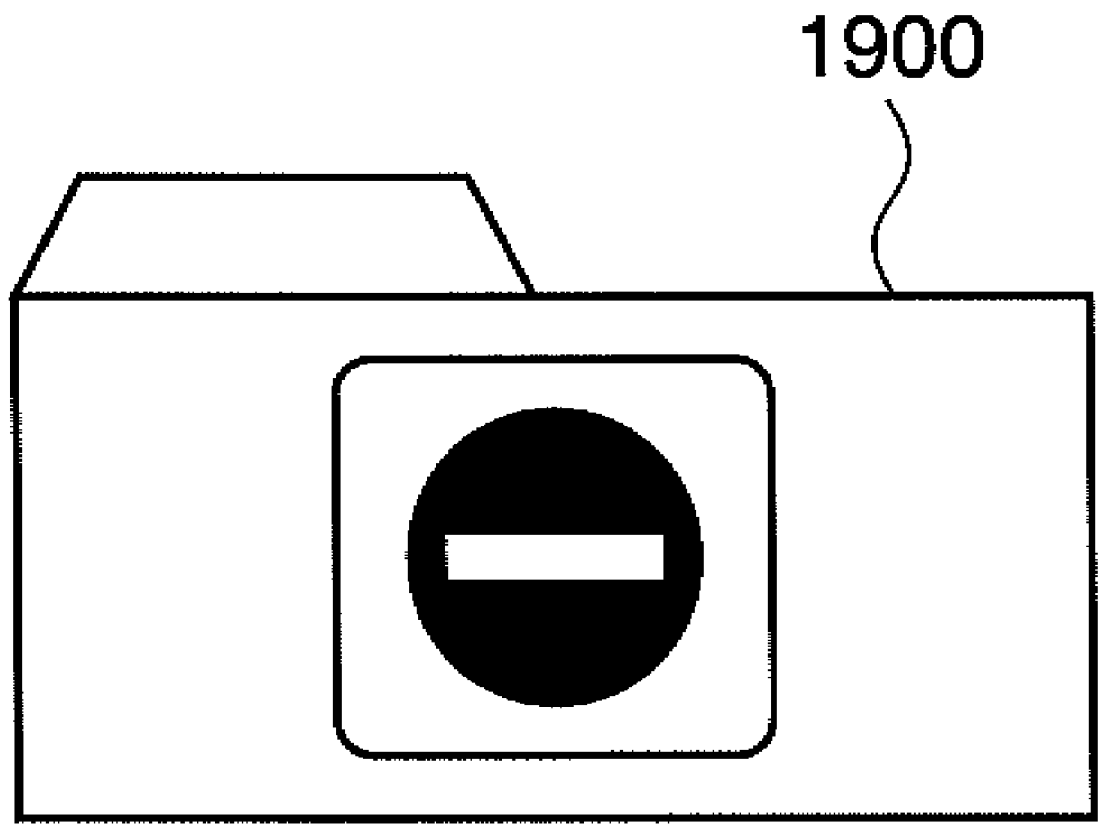
FIG. 19 is a view showing an example of the icon display of a folder which is displayed by the folder display change unit 707 of the print control program 303 when the status input to the status storage field 1203 is "access rejected"

FIG. 19 is a view showing an example of the icon display of a folder which is displayed by the folder display change unit 707 of the print control program 303 when the status input to the status storage field 1203 is "access rejected".

Figure 20:
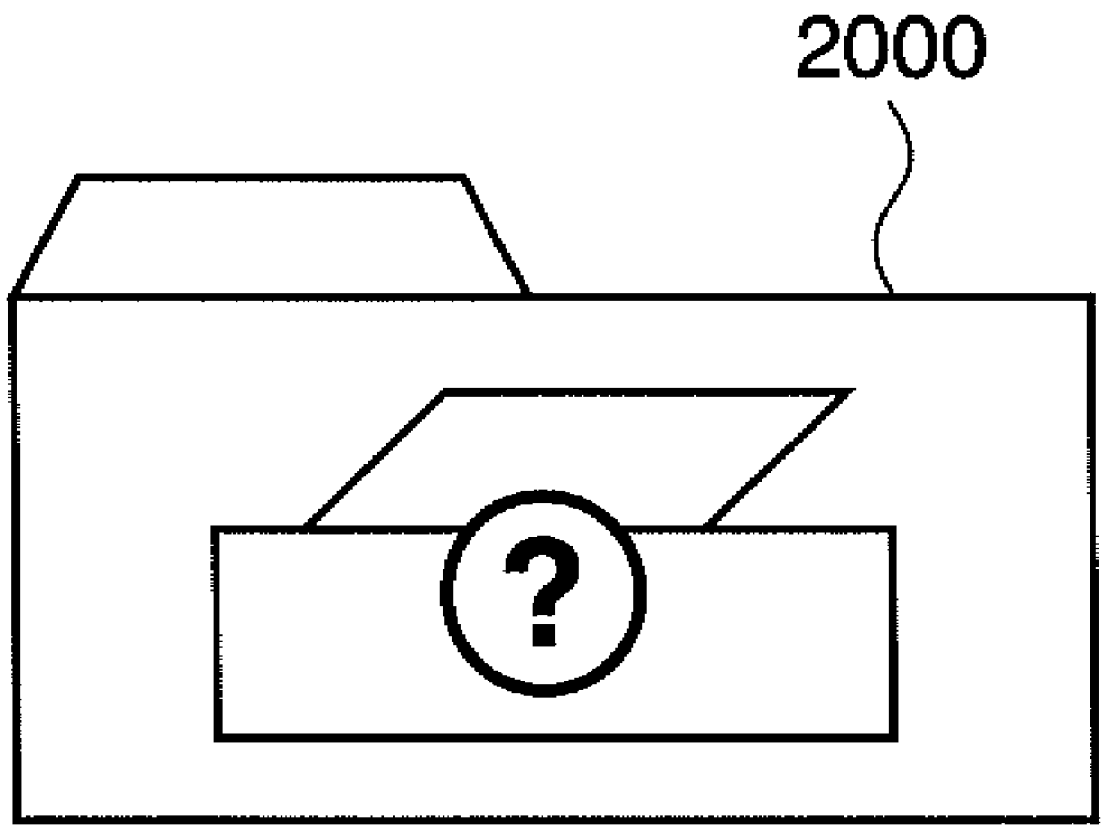
FIG. 20 is a view showing an example of the icon display of a folder which is displayed by the folder display change unit 707 of the print control program 303 when the status input to the status storage field 1203 is "printer unknown"

FIG. 20 is a view showing an example of the icon display of a folder which is displayed by the folder display change unit 707 of the print control program 303 when the status input to the status storage field 1203 is "printer unknown".

Figure 21:
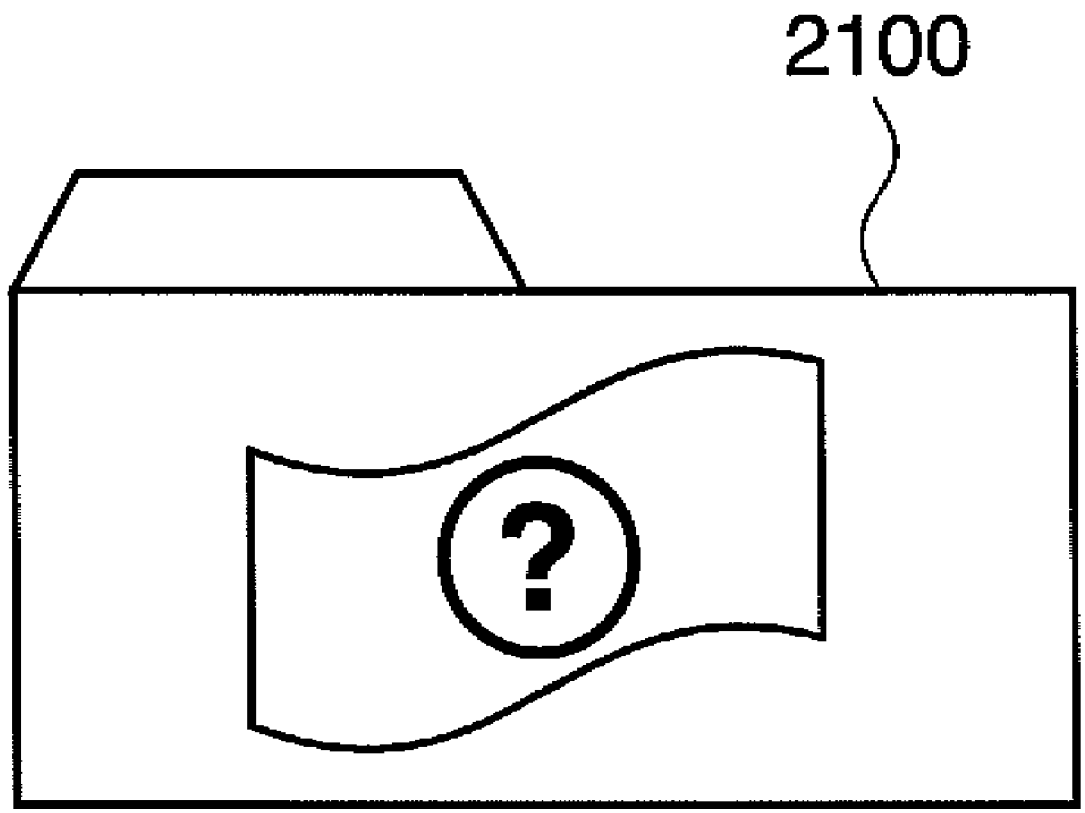
FIG. 21 is a view showing an example of the icon display of a folder which is displayed by the folder display change unit 707 of the print control program 303 when the status input to the status storage field 1203 is "job ticket unknown"

FIG. 21 is a view showing an example of the icon display of a folder which is displayed by the folder display change unit 707 of the print control program 303 when the status input to the status storage field 1203 is "job ticket unknown".

Figure 22:
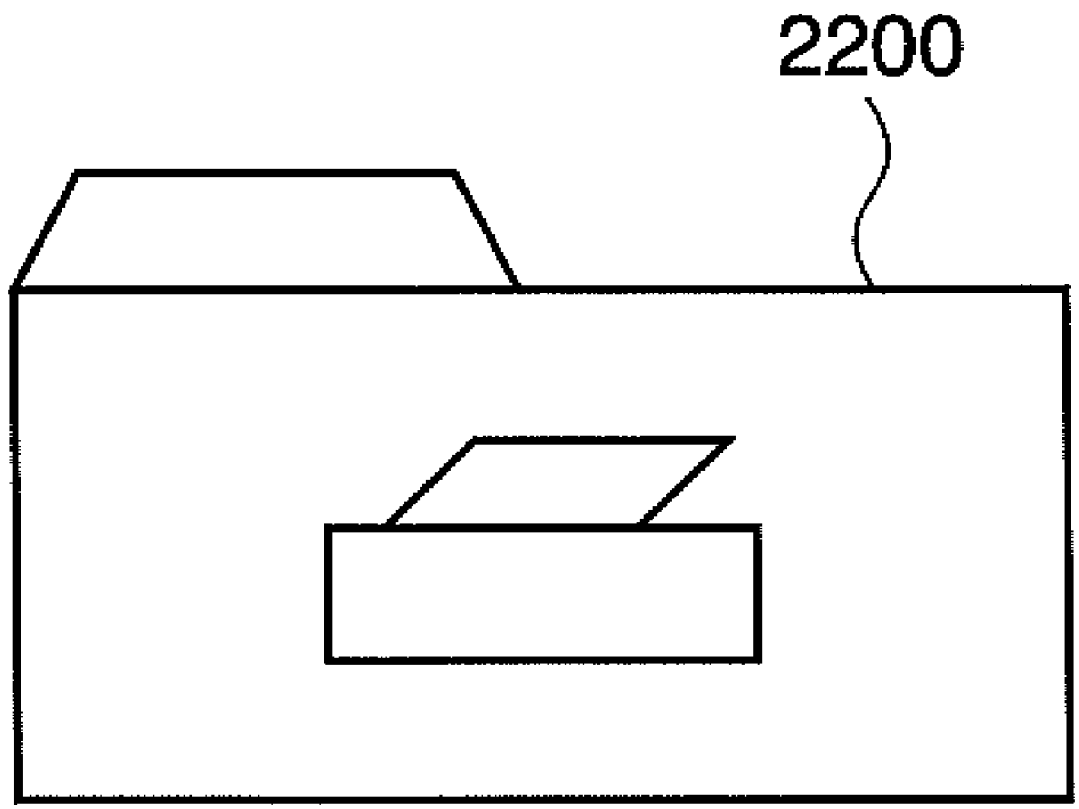
FIG. 22 is a view showing an example of the icon display of a folder which is displayed by the folder display change unit 707 of the print control program 303 when the status input to the status storage field 1203 is "in printing"

FIG. 22 is a view showing an example of the icon display of a folder which is displayed by the folder display change unit 707 of the print control program 303 when the status input to the status storage field 1203 is "in printing".

Figure 23:
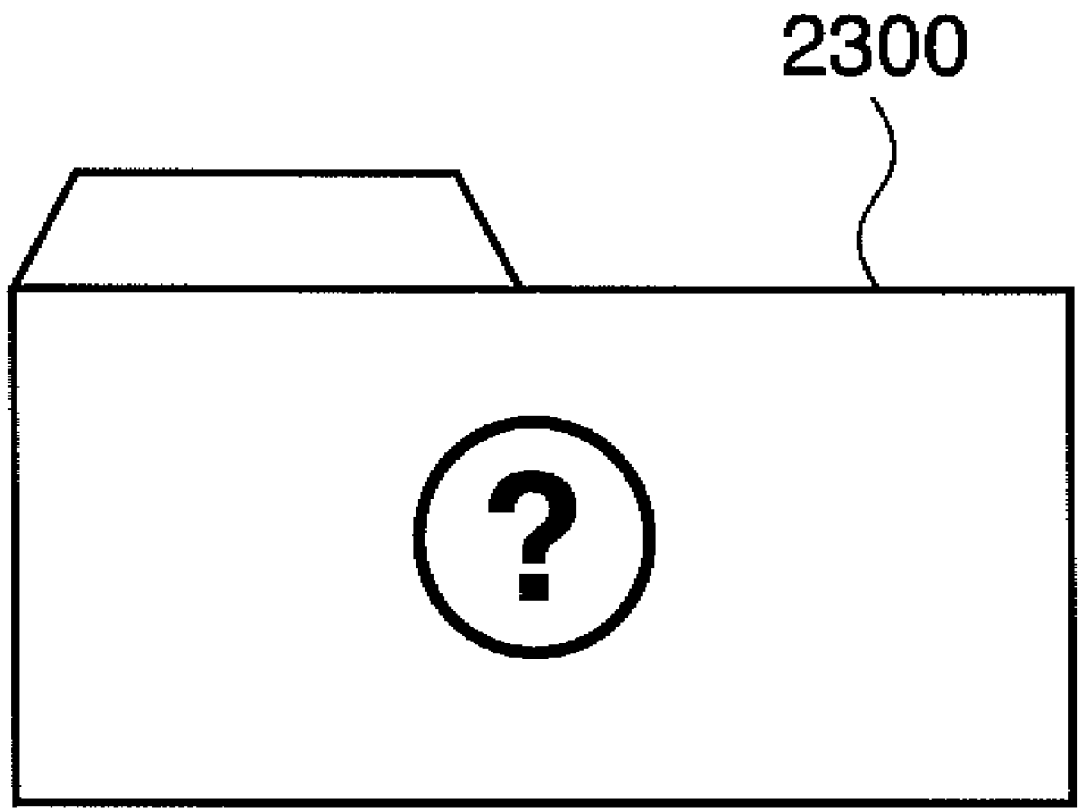
FIG. 23 is a view showing an example of the icon display of a folder which is displayed by the folder display change unit 707 of the print control program 303 when the status input to the status storage field 1203 is "folder unknown"

FIG. 23 is a view showing an example of the icon display of a folder which is displayed by the folder display change unit 707 of the print control program 303 when the status input to the status storage field 1203 is "folder unknown".

When the icon of a hot folder is designed to change in this way in accordance with a status input to the status storage field 1203 of the hot folder management table 602 (FIG. 12), the user can grasp the status of the hot folder just by looking at the icon display.

As is apparent from the above description, the client of this embodiment has the function of detecting a change in the network printer configuration information. If it is determined that it has become impossible to execute print processing complying with attribute information described in a job ticket associated with a hot folder, the client notifies the user of it. This prevents printing errors by the user.

The client of this embodiment also has the function of searching for a network printer capable of executing print processing and notifying the user of it if it has become impossible to execute print processing complying with attribute information described in a job ticket. The client also has the function of automatically changing the transmission destination setting to the network printer found by the search.

The client of this embodiment also has the function of notifying the user to attribute information which impedes execution of print processing if it has become impossible to execute print processing complying with attribute information described in a job ticket associated with a hot folder. The client also has the function of changing the attribute information to attribute information that allows execution of print processing.

This makes it possible to reduce the operation load on the user in changing the settings of a hot folder when network printer configuration information has changed. This also prevents the operability in use of a hot folder from becoming poor.

Second Embodiment

In the first embodiment, a network printer is used for print processing of electronic data. However, the image forming apparatus for executing print processing is not limited to a network printer. Any other image forming apparatus such as a facsimile apparatus or display is usable.

In the first embodiment, when the printer driver 306 has updated network printer configuration information, it is determined whether the network printer can execute print processing complying with attribute information described in a job ticket.

However, the present invention is not limited to this. For example, a print control program 303 may periodically acquire network printer configuration information held by a printer driver 306 at any timing except when the printer driver 306 has updated the network printer configuration information.

The print control program 303 may be registered in advance in the network printer so that the print control program 303 is directly notified of a change in the configuration information of the network printer.

The print control program 303 may periodically acquire network printer configuration information by an unit such as an MIB (Management Information Base) and determine whether the configuration information has changed.

In the first embodiment, six operation contents corresponding to the radio buttons 808 to 813 have been exemplified as the operation contents when the network printer has become unable to process a job ticket. However, the present invention is not limited to this. For example, when the network printer has become unable to process a job ticket, the hot folder setting window shown in FIG. 8 may be displayed to prompt the user to change the settings of the hot folder. Alternatively, the user may be notified by another method.

Third Embodiment

The third embodiment of the present invention will be described. In the first embodiment, when the configuration information of a network printer has been updated, it is determined whether attribute information described in a job ticket associated with a hot folder allows print processing by the network printer.

In the third embodiment, when electronic data is put (drag & drop) in a hot folder, it is determined whether attribute information described in a job ticket associated with the hot folder allows print processing by a network printer.

This enables to acquire network printer configuration information and confirm it in real time when electronic data is put in a hot folder. This embodiment will be described below in detail. The arrangement of a print system, the hardware configuration of a client, the memory maps of a RAM and an FD, the hardware configuration of a network printer, and the software configuration of a client are the same as in FIGS. 1 to 6, and a description thereof will not be repeated.

<1. Module Configuration of Print Control Program 2400>

Figure 24:
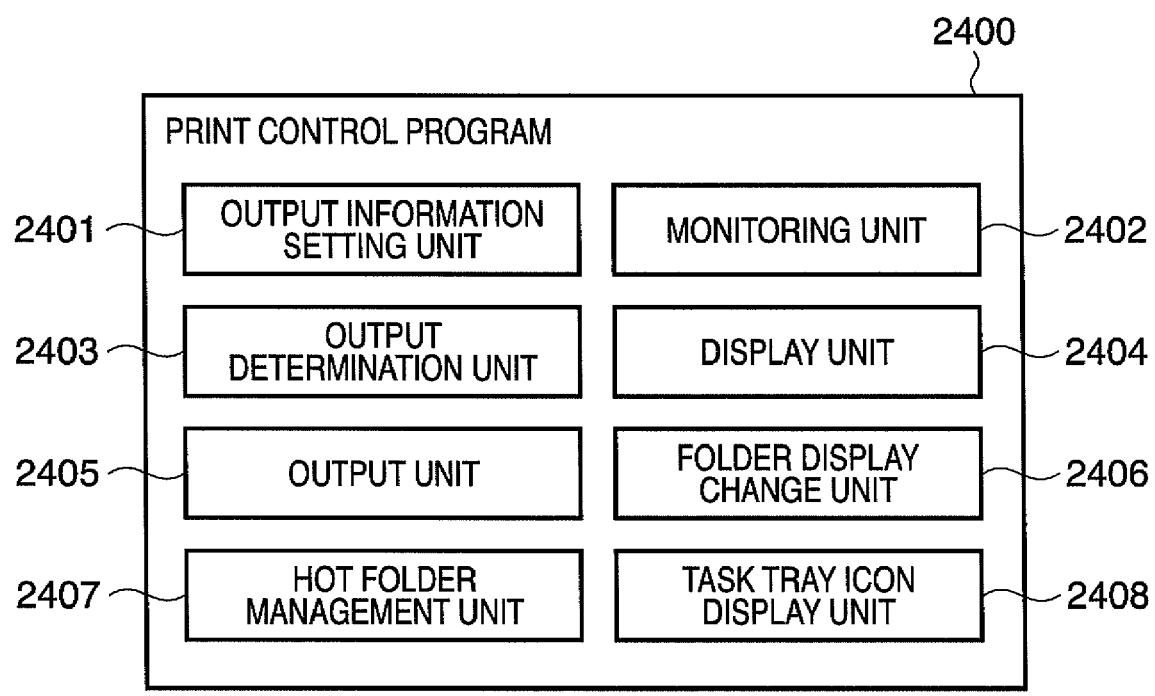
FIG. 24 is a block diagram showing an example of the module configuration of a print control program 2400 according to the third embodiment of the present invention.

FIG. 24 is a block diagram showing an example of the module configuration of a print control program 2400 according to the third embodiment of the present invention.

Referring to FIG. 24, reference numeral 2401 denotes an output information setting unit. The output information setting unit 2401 has a function of setting, in a hot folder, for example, a folder name on the file system of an operating system 302, information about a transmission destination, a job ticket name to be associated, and operation contents in a print processing disable state.

In setting a hot folder, a display unit 2404 displays, via the operating system 302, a hot folder setting window on a display 207 to set a hot folder.

A monitoring unit 2402 has a function of monitoring hot folders to detect electronic data added into a folder set as a hot folder by the output information setting unit 2401.

In monitoring hot folders, that new electronic data has been added is detected by periodically confirming a file list in a hot folder. Alternatively, monitoring may be done by detecting an event that takes place at the time of addition of electronic data.

An output determination unit 2403 has a function of determining, when electronic data is put in a hot folder, whether a network printer set as a transmission destination in the hot folder can execute print processing complying with attribute information described in a job ticket.

Whether print processing is executable or not is determined by, for example, comparing the configuration information of the network printer with the attribute information described in the job ticket. Alternatively, a printer driver 306 may be caused to determine by setting, in the printer driver 306, the attribute information described in the job ticket. Any other method is usable for the determination.

The display unit 2404 has a function of displaying a window of the print control program 2400 on the display 207 via the operating system 302.

An output unit 2405 has a function of transmitting a job ticket to a network printer 104 or 105 via an interface 209 and causing the network printer to execute print processing.

A folder display change unit 2406 has a function of changing the display form, on the file system of the operating system 302, of the icon of a folder set as a hot folder.

A hot folder management unit 2407 has a function of managing information related to a hot folder, which is set by the output information setting unit 2401, by using a hot folder management table (to be described later in detail with reference to FIG. 26).

A task tray icon display unit 2408 has a function of displaying the task tray icon of the print control program 2400 in a task tray on a window of the operating system 302 when the print control program 2400 is activated.

<2. User Interface of Print Control Program>

Examples of the user interface displayed on the display 207 by the display unit 2404 of the print control program 2400 will be described next.

<2.1 Hot Folder Setting Window>

Figure 25:
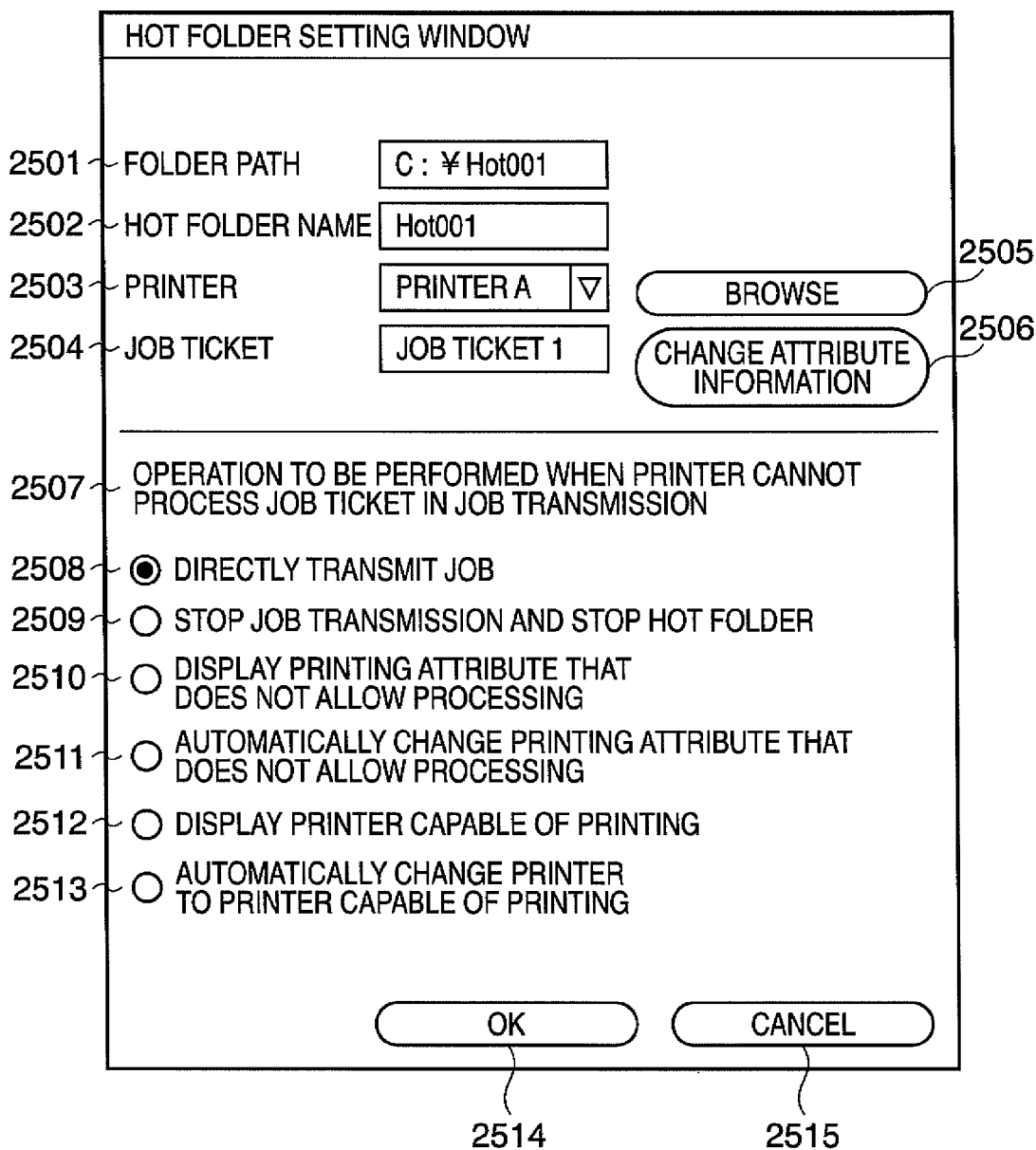
FIG. 25 is a view showing an example of a hot folder setting window.

FIG. 25 is a view showing an example of a hot folder setting window.

A folder path input field 2501 sets a folder path to designate a folder on the operating system 302.

A hot folder name input field 2502 sets the name of a hot folder to be used on the print control program 2400.

A printer name input field 2503 is used to select a network printer of a transmission destination. The network printer displayed in the printer name input field 2503 can be either a network printer registered in the operating system 302 or a network printer registered by another system. The printer name input field 2503 may be designed to add a new network printer.

A job ticket input field 2504 sets a job ticket name. The user can designate a job ticket on the file system of the operating system 302 by pressing a browse button 2505. This associates the job ticket with the hot folder.

An attribute information change button 2506 displays a user interface (attribute change window) to set attribute information to be described in the job ticket.

The user makes alternative selection by a radio button in a selection area 2507. Each radio button defines an operation to be performed in the client when the network printer has become unable to appropriately execute print processing complying with the attribute information described in the job ticket due to a change in the network printer configuration information.

A radio button 2508 sets to transmit a print job including a job ticket and electronic data to a network printer even when the network printer has become unable to execute print processing complying with the attribute information.

A radio button 2509 sets to exclude the hot folder from the monitoring targets and stop the function of transmitting a print job from the hot folder when the network printer has become unable to execute print processing complying with the attribute information.

A radio button 2510 sets to display, on the display 207, attribute information that does not allow processing by the network printer when the network printer has become unable to execute print processing complying with the attribute information.

A radio button 2511 sets to automatically change a set value of attribute information to allow the network printer 104 or 105 to execute print processing when the network printer has become unable to execute print processing complying with the attribute information.

A radio button 2512 sets to display, on the display 207, a network printer capable of executing print processing complying with the attribute information described in the job ticket when the designated network printer has become unable to execute print processing complying with the attribute information.

A radio button 2513 sets to automatically change the transmission destination to a network printer capable of executing printing complying with the attribute information described in the job ticket when the designated network printer has become unable to execute print processing complying with the attribute information.

An OK button 2514 determines the settings of the hot folder. If the network printer input to the printer name input field 2503 cannot execute processing complying with the attribute information described in the job ticket set in the job ticket input field 2504, pressing the OK button 2514 may be inhibited. Alternatively, after the user presses the OK button 2514, attribute information that does not allow processing may be displayed to prompt the user to change it.

A button 2515 cancels hot folder settings.

<2.2 Other Windows>

An attribute change window upon pressing the attribute information change button 2506 is the same as in FIG. 9, and a description thereof will not be repeated.

An attribute information list display window displayed when it is determined upon putting electronic data that print processing complying with the attribute information described in the job ticket cannot be executed because of a change in the network printer configuration information is also the same as in FIG. 10, and a description thereof will not be repeated.

A network printer list display window displayed when it is determined upon putting electronic data that print processing complying with the attribute information described in the job ticket cannot be executed because of a change in the network printer configuration information is also the same as in FIG. 11, and a description thereof will not be repeated.

<3. Explanation of Various Tables>

<3.1 Hot Folder Management Table>

The hot folder management table 2600 which manages hot folders set via the hot folder setting window (FIG. 25) will be described next.

FIG. 26 is a view showing an example of the hot folder management table 2600. Referring to FIG. 26, a hot folder name storage field 2601 holds hot folder names set in the hot folder name input field 2502.

A printer name storage field 2602 holds network printer names input to the printer name input field 2503 in association with the hot folder names.

A status storage field 2603 holds information about the current statuses of the hot folders. In this embodiment, "normal" is input to the status storage field 2603 for a hot folder without any particular abnormality.

If a network printer set in a hot folder cannot appropriately execute print processing complying with attribute information described in a job ticket associated with the hot folder, "print disable" is input to the status storage field 2603.

If the user who has logged in to the operating system 302 has no access authorization to a folder set as a hot folder, "access rejected" is input to the status storage field 2603. If the configuration information of a network printer set in the printer name input field 2503 cannot be acquired, "printer unknown" is input to the status storage field 2603.

If a file corresponding to the job ticket set in the job ticket input field 2504 is not found or is broken, or the contents of the job ticket lack necessary information, "job ticket unknown" is input to the status storage field 2603.

If electronic data and a job ticket put in the hot folder are being transferred as a print job to a network printer set as a transmission destination in the hot folder, "in printing" is input to the status storage field 2603. When the network printer is processing the print job, "in printing" is input to the status storage field 2603 as well.

If a folder set as a hot folder is not found because, for example, it was deleted from the file system of the operating system, "folder unknown" is input to the status storage field 2603.

A folder path storage field 2604 holds folder paths on the file system of the operating system, which are designated in the folder path input field 2501.

A job ticket name storage field 2605 holds job ticket names input to the job ticket input field 2504.

Reference numeral 2606 denotes an operation storage field. The operation storage field 2606 holds operation contents which are selected in the selection area 2507 and should be performed when a network printer has become unable to execute print processing complying with attribute information described in job tickets due to a change in the network printer configuration information.

The hot folder management table may be held in a memory of a client or saved in a file. The hot folder management table may be held using, for example, a database or any other unit.

<3.2 Other Tables>

The attribute information management table and network printer configuration information table are the same as in FIGS. 13 and 14, and a description thereof will not be repeated.

<4. Sequence (Overall Sequence) of Processing in Client>

The sequence of processing of the print control program 2400 in a client when network printer configuration information has changed will be described next.

Figure 27B:
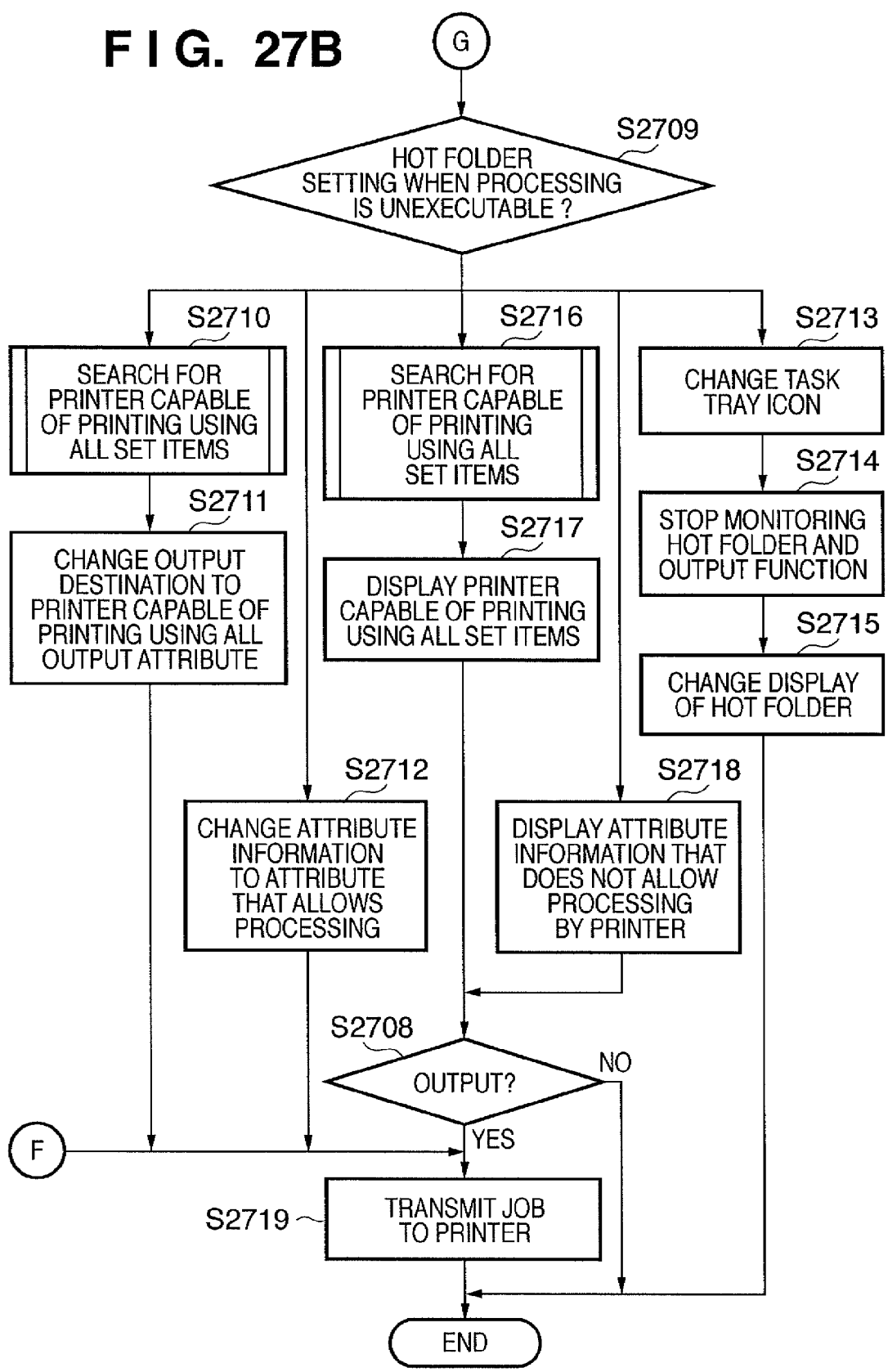
FIG. 27B is a flowchart illustrating the sequence of processing of the print control program 2400 in a client.

FIGS. 27A and 27B are flowcharts illustrating the sequence of processing of the print control program 2400 in a client.

When electronic data is put in a hot folder, the monitoring unit 2402 detects it in step S2701. This triggers off the following processing.

In step S2702, the output determination unit 2403 of the print control program 2400 determines operation contents to be performed when the network printer has become unable to execute print processing complying with attribute information described in the job ticket. More specifically, the output determination unit 2403 checks the radio button 2508 in the selection area 2507 and determines whether the operation contents input to the operation storage field 2606 of the hot folder management table 2600 (FIG. 26) represent "directly transmit job".

If the operation contents input to the operation storage field 2606 represent "directly transmit job", the process advances to step S2719. If the operation contents input to the operation storage field 2606 represent processing other than "directly transmit job", the process advances to step S2703.

In step S2703, the output determination unit 2403 of the print control program 2400 acquires the configuration information of the hot folder from the printer driver 306.

In step S2704, the hot folder management unit 2407 of the print control program 2400 refers to the job ticket name storage field 2605 of the hot folder management table 2600 (FIG. 26) and reads out attribute information described in the job ticket.

In step S2705, the output determination unit 2403 of the print control program 2400 selects one of the set items of the readout attribute information. Processing for the selected set item is performed from then on.

In step S2706, the output determination unit 2403 of the print control program 2400 compares the network printer configuration information received in step S2703 with the attribute information read out in step S2705 in association with the selected set item. The output determination unit 2403 thus determines whether the readout attribute information allows printing by the network printer.

If it is determined in step S2706 that the network printer can execute print processing, the process advances to step S2707. In step S2707, the output determination unit 2403 of the print control program 2400 determines whether all set items of the attribute information described in the job ticket have undergone the investigation about the possibility of printing. If it is determined in step S2707 that not all set items have been investigated, the process returns to step S2705 to investigate the remaining set items. If it is determined that all set items have been investigated, the process advances to step S2719.

If it is determined in step S2706 that the network printer cannot execute print processing, the process advances to step S2709.

In step S2709, the output determination unit 2403 of the print control program 2400 determines operation contents to be performed when the network printer has become unable to execute print processing complying with the attribute information described in the job ticket. More specifically, the output determination unit 2403 checks one of the radio buttons 2509 to 2513 except the radio button 2508 in the selection area 2507 and determines the operation contents stored in the operation storage field 2606 of the hot folder management table 2600 (FIG. 26).

If, in step S2709, the output determination unit 2403 checks the radio button 2510 in the selection area 2507 and determines that "display printing attribute list" is input to the operation storage field 2606, the process advances to step S2718.

In step S2718, the display unit 2404 of the print control program 2400 displays the attribute information list display window (FIG. 10). In displaying the attribute information list display window (FIG. 10), it may be checked whether all set items of the attribute information described in the job ticket allow print processing by the network printer, and set items that do not allow print processing may be displayed.

If, in step S2709, the output determination unit 2403 checks the radio button 2511 in the selection area 2507 and determines that "automatically change printing attribute" is input to the operation storage field 2606, the process advances to step S2712.

In step S2712, the output determination unit 2403 changes the attribute information (set item 1001 and set value 1002) described in the job ticket set in the hot folder to attribute information which allows print processing by the network printer.

If, in step S2709, the output determination unit 2403 checks the radio button 2509 in the selection area 2507 and determines that "stop hot folder" is input to the operation storage field 2606, the process advances to step S2713.

Figure 29:
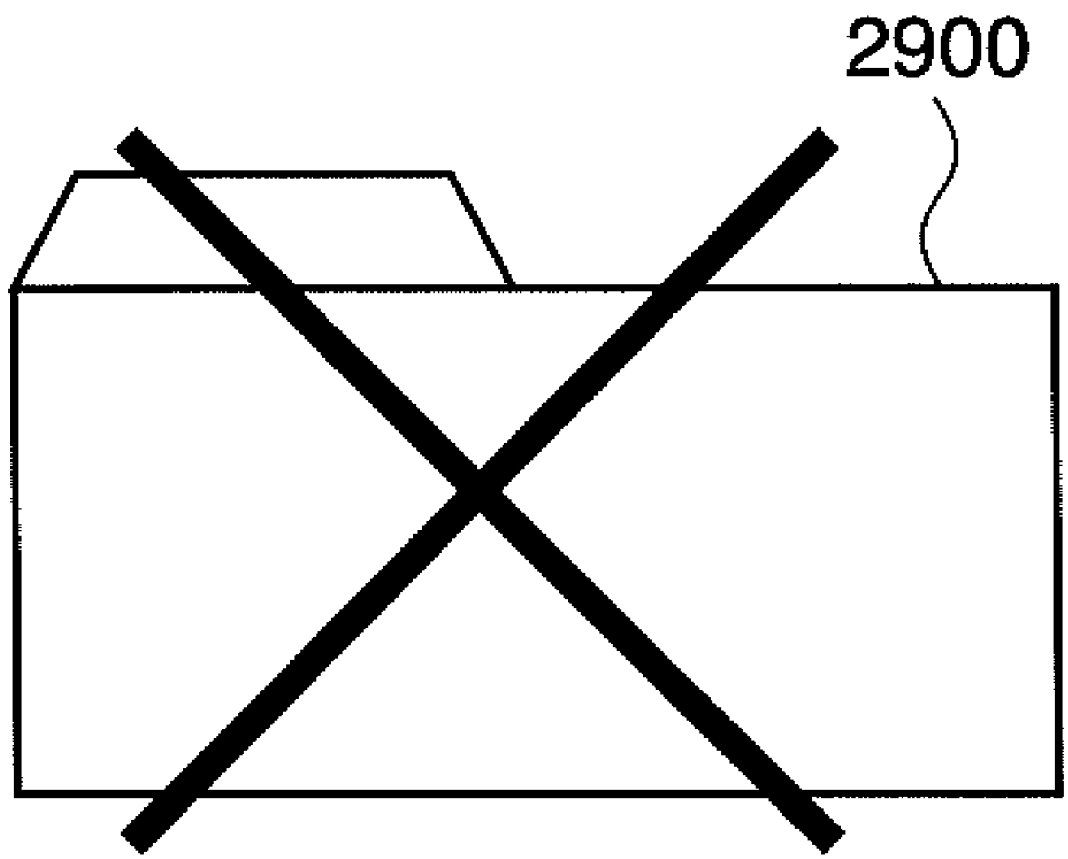
FIG. 29 is a view showing another example of the task tray icon.

In step S2713, the task tray icon display unit 2408 of the print control program 2400 blinks the icon of the print control program 2400 displayed in the task tray icon of the operating system. To blink the task tray icon, a task tray icon shown in FIG. 28 and that shown in FIG. 29 are alternately displayed at a predetermined interval. This notifies the user that the print processing of the electronic data put in the hot folder has not been executed.

In step S2714, the output determination unit 2403 of the print control program 2400 excludes the hot folder from the monitoring targets of the monitoring unit 2402 and changes the status storage field 2603 of the hot folder management table 2600 to "print disable". The output determination unit 2403 also stops the function of causing the output unit 2405 to transmit the print job from the hot folder to the network printer.

In step S2715, the folder display change unit 2406 of the print control program 2400 changes the icon display of the folder on the file system of the operating system 302.

Changing the icon display of the hot folder on the file system of the operating system can be implemented by, for example, placing a special setting file in the folder. However, the change method is not limited to this. The icon display of the folder on the file system of the operating system can be changed by any other method.

If, in step S2709, the output determination unit 2403 checks the radio button 2512 in the selection area 2507 and determines that "display printer list" is input to the operation storage field 2606, the process advances to step S2716.

In step S2716, the output determination unit 2403 of the print control program 2400 searches for a network printer capable of processing all set items of the attribute information described in the job ticket. The search processing in step S2716 is the same as in FIG. 16, and a description thereof will not be repeated.

In step S2717, the result of search processing in step S2716 is displayed as the network printer list display window (FIG. 11) that displays network printers capable of printing.

If, in step S2709, the output determination unit 2403 checks the radio button 2513 in the selection area 2507 and determines that "automatically change printer" is input to the operation storage field 2606, the process advances to step S2710.

In step S2710, the output determination unit 2403 of the print control program 2400 searches for a network printer capable of processing all set items of the attribute information described in the job ticket.

In step S2711, the output determination unit 2403 of the print control program 2400 selects one of the network printers capable of processing all set items of the attribute information and changes the hot folder transmission destination to the selected network printer.

The selected network printer may be either the first network printer found by the network printer search processing or a network printer capable of executing print processing earliest. The network printer can be selected by any other method.

If no network printer capable of processing all set items of the attribute information is found at all by the search processing in step S2710, the processing in steps S2713 to S2715 may be executed. Alternatively, the processing in step S2712 or S2718 may be executed.

In step S2708, the output determination unit 2403 of the print control program 2400 determines based on the attribute information list display window or network printer list display window whether the settings of the hot folder are changed, and an electronic data print start instruction is input.

If it is determined in step S2708 that printing of the electronic data is canceled, the processing is ended.

If it is determined in step S2708 that an electronic data print start instruction is input, the process advances to step S2719. In step S2719, the output unit 2405 of the print control program 2400 transmits the electronic data and a print job complying with the attribute information described in the job ticket to the network printer.

As described above, in this embodiment, upon detecting that electronic data is put in a hot folder, it is determined whether print processing complying with attribute information described in a job ticket set in the hot folder is executable.

If it is determined that processing is not executable, the attribute information described in the job ticket is displayed to prompt the user to change it. This allows the user to recognize that no desired printing result is obtained and change the attribute information described in the job ticket.

If it is determined that processing is not executable, of the set items of the attribute information described in the job ticket, set items which do not allow processing by the network printer are automatically changed to those which allow print processing by the network printer. This saves the user the trouble of changing the attribute information.

If it is determined that processing is not executable, network printers capable of obtaining a normal printing result using the job ticket are listed to allow the user to select a network printer as the transmission destination. This enables the user to recognize the network printers capable of obtaining a desired printing result.

If it is determined that processing is not executable, the network printer of the transmission destination is automatically changed to a network printer capable of obtaining a normal printing result using the job ticket. This saves the user the trouble of setting the network printer of the transmission destination.

It is consequently possible to minimize the operation load on the user in putting electronic data in a hot folder.

As is apparent from the above description, according to this embodiment, it is possible to change the settings of each hot folder without deteriorating the operability for a user who uses a hot folder even when the configuration of an image forming apparatus has changed.

Other Embodiments

The present invention is also applicable to a system including a plurality of devices (e.g., host computer, interface device, reader, and printer) or an apparatus (e.g., copying machine or facsimile apparatus) including a single device.

The object of the present invention is also achieved by supplying a recording medium which records software program codes for implementing the functions of the above-described embodiments to the system or apparatus. In this case, the functions are implemented by causing the computer (or CPU or MPU) of the system or apparatus to read out and execute the program codes stored in the recording medium. In this case, the recording medium which records the program codes constitutes the present invention.

Examples of the recording medium usable to supply the program codes are a Floppy® disk, hard disk, optical disk, magnetooptical disk, CD-ROM, CD-R, magnetic tape, non-volatile memory card, and ROM.

The functions of the above-described embodiments are implemented not only when the computer executes the read-out program codes but also when the OS (Operating System) running on the computer partially or wholly executes actual processing based on the instructions of the program codes.

The functions of the above-described embodiments are also implemented when the program codes read out from the recording medium are written in the memory of a function expansion board inserted into the computer or a function expansion unit connected to the computer. More specifically, after the program codes are written in the memory, the CPU of the function expansion board or function expansion unit partially or wholly executes actual processing based on the instructions of the program codes, thereby implementing the functions of the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-143790, filed on May 30, 2007, which is hereby incorporated by reference herein in its entirety.

What is claimed is:

1. An information processing apparatus which is connected to an image forming apparatus and transmits, to the image forming apparatus, electronic data via a hot folder which sets attribute information defining output processing to be executed by the image forming apparatus, comprising:

a holding unit configured to hold, in association with the hot folder, information about an operation of the information processing apparatus upon detecting a change in the processing contents;

a detection unit configured to detect the change in processing contents executable by the image forming apparatus, independently of the timing of putting electronic data in the hot folder;

a determination unit configured to determine whether the image forming apparatus can execute output processing complying with the attribute information by comparing the changed processing contents with the attribute information set in the hot folder; and a control unit configured to control the operation of the information processing apparatus on the basis of the information about the operation held in association with the hot folder which sets the attribute information determined by said determination unit not to allow the execution;

wherein the control unit changes an icon display of the hot folder based on the result of the determination which is performed by the determination unit when the detection unit detects the change; and wherein when processing of changing the attribute information determined by said determination unit not to allow the execution, to attribute information that allows execution by the image forming apparatus with the changed processing contents, is set as the information about the operation of the information processing apparatus, said control unit controls to change the attribute information to attribute information that allows the execution upon determination by said determination unit.

2. The apparatus according to claim 1, wherein when processing of displaying the attribute information determined by said determination unit not to allow the execution is set as the information about the operation of the information processing apparatus, said control unit controls to display the attribute information determined not to allow the execution upon determination by said determination unit.

3. The apparatus according to claim 1, wherein when processing of stopping transmission of the electronic data via the hot folder which sets the attribute information determined by said determination unit not to allow the execution is set as the information about the operation of the information processing apparatus, said control unit controls to stop transmission of the electronic data via the hot folder upon determination by said determination unit.

4. The apparatus according to claim 3, wherein in controlling to stop transmission of the electronic data via the hot folder, said control unit changes an icon display of the hot folder.

5. The apparatus according to claim 1, wherein when processing of displaying another image forming apparatus capable of executing output processing complying with the attribute information determined by said determination unit not to allow the execution is set as the information about the operation of the information processing apparatus, said control unit controls to display said other image forming apparatus upon determination by said determination unit.

6. The apparatus according to claim 1, wherein when processing of changing a transmission destination of the electronic data via the hot folder which sets the attribute information determined by said determination unit not to allow the execution to an image forming apparatus capable of executing output processing complying with the attribute information is set as the information about the operation of the information processing apparatus, said control unit controls to change the transmission destination of the electronic data to the image forming apparatus capable of the execution upon determination by said determination unit.

7. The apparatus according to claim 1, further comprising a setting unit configured to set the hot folder,
said setting unit being capable of setting the information about the operation of the information processing apparatus.

8. The apparatus according to claim 1, wherein said determination unit performs the determination upon detection by said detection unit.

9. An information processing method of an information processing apparatus which is connected to an image forming apparatus and transmits, to the image forming apparatus, electronic data via a hot folder which sets attribute information defining output processing to be executed by the image forming apparatus, comprising the steps of:
holding, in association with the hot folder, information about an operation of the information processing apparatus upon detecting a change in the processing contents;
detecting the change in processing contents executable by the image forming apparatus, independently of the timing of putting electronic data in the hot folder;
determining whether the image forming apparatus can execute output processing complying with the attribute information by comparing the changed processing contents with the attribute information set in the hot folder; and
controlling the operation of the information processing apparatus on the basis of the information about the operation held in association with the hot folder which sets the attribute information determined in the determining step not to allow the execution,
wherein the controlling step changes an icon display of the hot folder based on the result of the determination which is performed in the determining step when the detecting step detects the change, and
wherein when processing of changing the attribute information determined by said determination step not to allow the execution, to attribute information that allows execution by the image forming apparatus with the changed processing contents, is set as the information about the operation of the information processing apparatus, said control step controls to change the attribute information to attribute information that allows the execution upon determination by said determination step.

10. A non-transitory computer-readable storage medium storing a control program which causes a computer to execute an information processing method, the method comprising the steps of:
holding, in association with the hot folder, information about an operation of the information processing apparatus upon detecting a change in the processing contents;
detecting the change in processing contents executable by the image forming apparatus, independently of the timing of putting electronic data in the hot folder;
determining whether the image forming apparatus can execute output processing complying with the attribute information by comparing the changed processing contents with the attribute information set in the hot folder; and
controlling the operation of the information processing apparatus on the basis of the information about the operation held in association with the hot folder which sets the attribute information determined in the determining step not to allow the execution,
wherein the controlling step changes an icon display of the hot folder based on the result of the determination which is performed in the determining step when the detecting step detects the change; and
wherein when processing of changing the attribute information determined by said determination step not to allow the execution, to attribute information that allows execution by the image forming apparatus with the changed processing contents, is set as the information about the operation of the information processing apparatus, said control step controls to change the attribute information to attribute information that allows the execution upon determination by said determination step.

* * * * *